US012797811B2

(12) United States Patent
Simmons et al.

(10) Patent No.: US 12,797,811 B2
(45) Date of Patent: Nov. 17, 2026

(54) GAS LIQUID MIXING DEVICE, AND RELATED SYSTEMS AND METHODS

(71) Applicant: White Knight Fluid Handling Inc., Kamas, UT (US)

(72) Inventors: Tom Simmons, Kamas, UT (US); Courtney Parsons, Kamas, UT (US)

(73) Assignee: White Knight Fluid Handling Inc., Kamas, UT (US)

(*) Notice: Subject to any disclaimer, the term of this patent is extended or adjusted under 35 U.S.C. 154(b) by 924 days.

(21) Appl. No.: 17/203,544

(22) Filed: Mar. 16, 2021

(65) Prior Publication Data

US 2022/0297068 A1 Sep. 22, 2022

(51) Int. Cl.

| | |
|---|---|
| ***B01F 7/00*** | (2006.01) |
| ***B01F 3/04*** | (2006.01) |
| ***B01F 15/02*** | (2006.01) |
| ***B01F 23/20*** | (2022.01) |
| ***B01F 27/272*** | (2022.01) |
| ***B01F 35/71*** | (2022.01) |
| ***B01F 35/75*** | (2022.01) |
| *B01F 101/24* | (2022.01) |
| *B01F 101/58* | (2022.01) |

(52) U.S. Cl.

CPC .......... *B01F 27/2722* (2022.01); *B01F 23/29* (2022.01); *B01F 35/7176* (2022.01); *B01F 35/7544* (2022.01); *B01F 2101/24* (2022.01); *B01F 2101/58* (2022.01)

(58) Field of Classification Search

CPC ... B01F 27/2722; B01F 23/23; F16C 32/0425

See application file for complete search history.

(56) References Cited

U.S. PATENT DOCUMENTS

| | | | | |
|---|---|---|---|---|
| 6,386,751 | B1 | 5/2002 | Wooton et al. | |
| 9,314,557 | B2 * | 4/2016 | Ricci | A61M 60/82 |
| 11,421,694 | B2 | 8/2022 | Simmons et al. | |
| 2002/0077373 | A1 | 6/2002 | Hudson et al. | |
| 2020/0248696 | A1 | 8/2020 | Simmons et al. | |
| 2021/0018475 | A1 * | 1/2021 | Plachetka | G01N 30/16 |

FOREIGN PATENT DOCUMENTS

| | | | |
|---|---|---|---|
| DE | 3500573 | A1 | 7/1986 |
| EP | 2749780 | A1 | 7/2014 |
| JP | 11-303788 | A | 11/1999 |
| JP | 2005-523147 | A | 8/2005 |
| JP | 2006-153037 | A | 6/2006 |

(Continued)

OTHER PUBLICATIONS

International Search Report for International Application No. PCT/US2022/019001, mailed Sep. 19, 2022, 7 pages.

(Continued)

*Primary Examiner* — Elizabeth Insler

(74) *Attorney, Agent, or Firm* — TraskBritt

(57) ABSTRACT

A fluid mixing system may include a fluid inlet, a gas inlet, a common outlet, and a mixing chamber. The mixing chamber may be defined between a stator and a magnetically levitated rotor. The rotor may be configured to rotate relative to the stator. The mixing chamber may include an uneven surface. The mixing chamber may operatively couple the fluid inlet and the gas inlet to the common outlet.

10 Claims, 14 Drawing Sheets

(56) References Cited

FOREIGN PATENT DOCUMENTS

| | | | |
|---|---|---|---|
| JP | 2019-214003 | A | 12/2019 |
| WO | 2003/089123 | A1 | 10/2003 |

OTHER PUBLICATIONS

International Written Opinion for International Application No. PCT/US2022/019001, mailed Sep. 19, 2022, 10 pages.

Japanese Notice of Reasons for Refusal for Japanese Application No. 2023-557151, dated Sep. 25, 2024, 8 pages with English translation.

* cited by examiner

GAS LIQUID MIXING DEVICE, AND RELATED SYSTEMS AND METHODS

TECHNICAL FIELD

Embodiments of the present disclosure generally relate to mixing devices. In particular, embodiments of the present disclosure relate to mixing devices configured to mix a gas into a liquid and related systems and methods.

BACKGROUND

Mixing gasses into liquids is a common process for creating many different fluid combinations for processes such as semiconductor manufacturing processes, cleaning processes, etc. For example, oxygenated water and ozonated water are fluids that are commonly used in cleaning processes, such as for cleaning semiconductor materials before, during, and after a semiconductor manufacturing process. The typical process for mixing the gas into the liquid is a passive process where the liquid (e.g., water) is held in a tank and the gas (e.g., oxygen or ozone) is released into a bottom portion of the tank. The gas then rises through the tank as bubbles that slowly dissipate into the liquid as contact between the gas and the liquid causes the gas to dissipate or dissolve into the liquid.

BRIEF SUMMARY

Some embodiments of the present disclosure may include a fluid mixing system. The fluid mixing system may include a gas inlet, a fluid mixing device, and a pump. The fluid mixing device may include a fluid inlet, a common outlet, and a mixing chamber. The mixing chamber may be defined between a stator and a magnetically levitated rotor. The rotor may be configured to rotate relative to the stator. The mixing chamber may include an uneven surface. The mixing chamber may operatively couple the fluid inlet and the gas inlet to the common outlet. The pump may be separate from the fluid mixing device and coupled to the fluid mixing device through a pipe.

Another embodiment of the present disclosure may include a mixing device. The mixing device may include a stator and a rotor. The stator may include at least two annular permanent magnets having a first polarity. The stator may further include an inner surface. The rotor may be configured to rotate relative to the stator. The rotor may include at least two complementary annular permanent magnets having a second polarity. The at least two complementary annular permanent magnets may be positioned coaxially with the at least two annular permanent magnets. The rotor may further include an uneven outer surface. The mixing device may further include a mixing cavity defined between the inner surface of the stator and the uneven outer surface of the rotor.

Another embodiment of the present disclosure may include a method of mixing a liquid with a gas. The method may include flowing the liquid into a chamber defined between an inner surface of a stator and an uneven outer surface of a rotor. The rotor may be configured to float within the stator on magnetic bearings. The method may further include flowing the gas into the chamber defined between the inner surface of the stator and the uneven outer surface of the rotor. The method may also include rotating the rotor relative to the stator. The method may further include mixing the liquid and the gas with the uneven outer surface of the rotor as the rotor rotates.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular mixing device, mixing system, or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "magnetic material" means and includes ferromagnetic materials, ferrimagnetic materials, antiferromagnetic, and paramagnetic materials.

Dispersing or mixing gaseous fluids, such as air, oxygen, ozone, etc., into liquids, such as water, solvents, etc., is used to create cleaning fluids for processes such as cleaning steps in manufacturing processes. For example, ozonated water may be utilized in several different cleaning steps during the manufacturing process for semiconductor devices, such as wafer cleaning, photoresist removal, cleaning after dicing, particle removal before stacking, etc. Increasing the percentage of the gaseous fluid mixed into the liquid may enhance the cleaning properties of the resulting mixture.

Ozone reactors are a common tool used for mixing ozone into a liquid. An ozone reactor includes a chamber with the liquid and provides the ozone into the liquid at a lower section of the chamber allowing the ozone gas to disperse into the liquid as bubbles of ozone gas travel through the liquid. The ozone may not be fully dissipated into the liquid resulting in large bubbles of un-dissipated ozone within the fluid. Mixing ozone or other gasses into the liquid with turbulent flow and/or other mixing components may increase the amount of the gas dissipated into the liquid. Increasing the amount of gas dissipated into the fluid may enhance the cleaning properties of the associated fluid. Enhancing the cleaning properties of the fluid may increase the efficiency of the associated cleaning processes and/or reduce the amount of cleaning fluid used in the processes.

Figure 1:
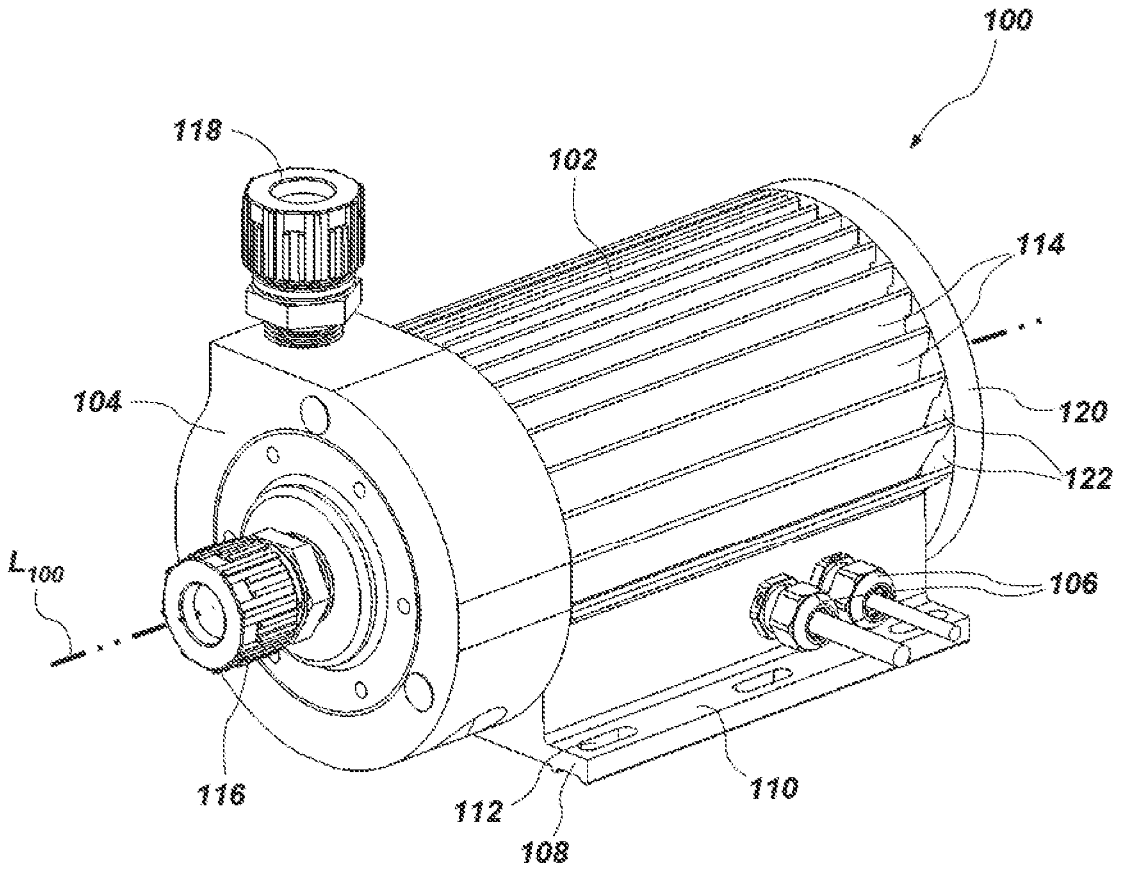
FIG. 1 illustrates a perspective view of a mixing device in accordance with one or more embodiments of the present disclosure.

FIG. 1 illustrates an embodiment of a mixing device 100 according to the present disclosure. The mixing device 100 may include a body 102 and a flow housing 104. The body 102 may include a motor (e.g., a D.C. motor, an A.C. motor, etc.), drive components for the mixing device 100, and/or a mixing chamber. The body 102 may include ports 106 that enable power and/or electrical signals (e.g., electricity) to be conveyed from an external power source and/or controller/drive to the motor within the body 102. The body 102 may include a mounting structure 108.

The mounting structure 108 may be used to secure the mixing device 100 to a stationary object (e.g., wall, floor, mounting pad, structure, frame, etc.). In some embodiments, the mounting structure 108 may include a flange 110 having at least one hole 112 (e.g., slot, opening, etc.) extending therethrough. The hole 112 may be configured to receive mounting hardware such as bolts, studs, screws, straps (e.g., metal straps, polymer straps, cloth straps, nylon straps, band straps, clamping straps, etc.), cables, brackets, hooks, etc. In some embodiments, the mounting structure 108 may include integral mounting hardware (e.g., studs, clamps, threaded inserts, etc.).

The body 102 may also include one or more fins 114 (e.g., protrusions, plates, etc.) extending from the body 102. In some embodiments, the fins 114 may be configured to aid in transferring heat from the motor (e.g., cooling the motor) or other components inside the body 102. The fins 114 may be linear (e.g. substantially straight) and extend radially outward from the body 102, and may be oriented parallel to a longitudinal axis of the body 102, as shown in FIG. 1. In some embodiments, the fins 114 may be substantially circular (e.g., annular, etc.) extending circumferentially about a central axis L100 (e.g., in a series of rings, spiral, helix, etc.).

The flow housing 104 may include a back plate 120. The back plate 120 may include one or more cooling ports 122. The cooling ports 122 may be configured to direct fluid (e.g., air, water, etc.) flow over the fins 114. In some embodiments, the cooling ports 122 may be configured to direct passive fluid flow. In some embodiments, an auxiliary device such as a fan or pump may be coupled to the back plate 120 and configured to force fluid flow through the cooling ports 122 and over the fins 114. For example, the auxiliary device may be configured to draw fluid through the cooling ports 122 such that the fluid may flow over the fins 114 and then be drawn through the cooling ports 122 by the auxiliary device. In some embodiments, the auxiliary device may be configured to force fluid through the cooling ports 122 and then over the fins 114.

The flow housing 104 may include a first fluid port 116 and a second fluid port 118. The fluid may enter the flow housing 104 through the first fluid port 116. The fluid entering through the first fluid port 116 may include multiple fluids such as liquids (e.g., water) and gasses (e.g., air, ozone, etc.). The mixing device 100 may be configured to mix the multiple fluids to form a substantially homogeneous mixture of the fluids before the fluids flow out of the second fluid port 118. In some embodiments, the body 102 or the flow housing 104 may include additional inlet ports configured to receive additional fluids to be mixed with the fluid received through the first fluid port 116 in a mixing chamber within the body 102. For example, the fluid received through the first fluid port 116 may be a single fluid, such as a liquid and the fluid received through the additional inlet port may be another fluid such as a gas, as described in further detail below in FIGS. 10 and 11. The fluids may be combined and mixed into a substantially homogeneous mixture within the mixing chamber in the body 102 of the mixing device 100 before flowing out through the second fluid port 118.

Figure 2:
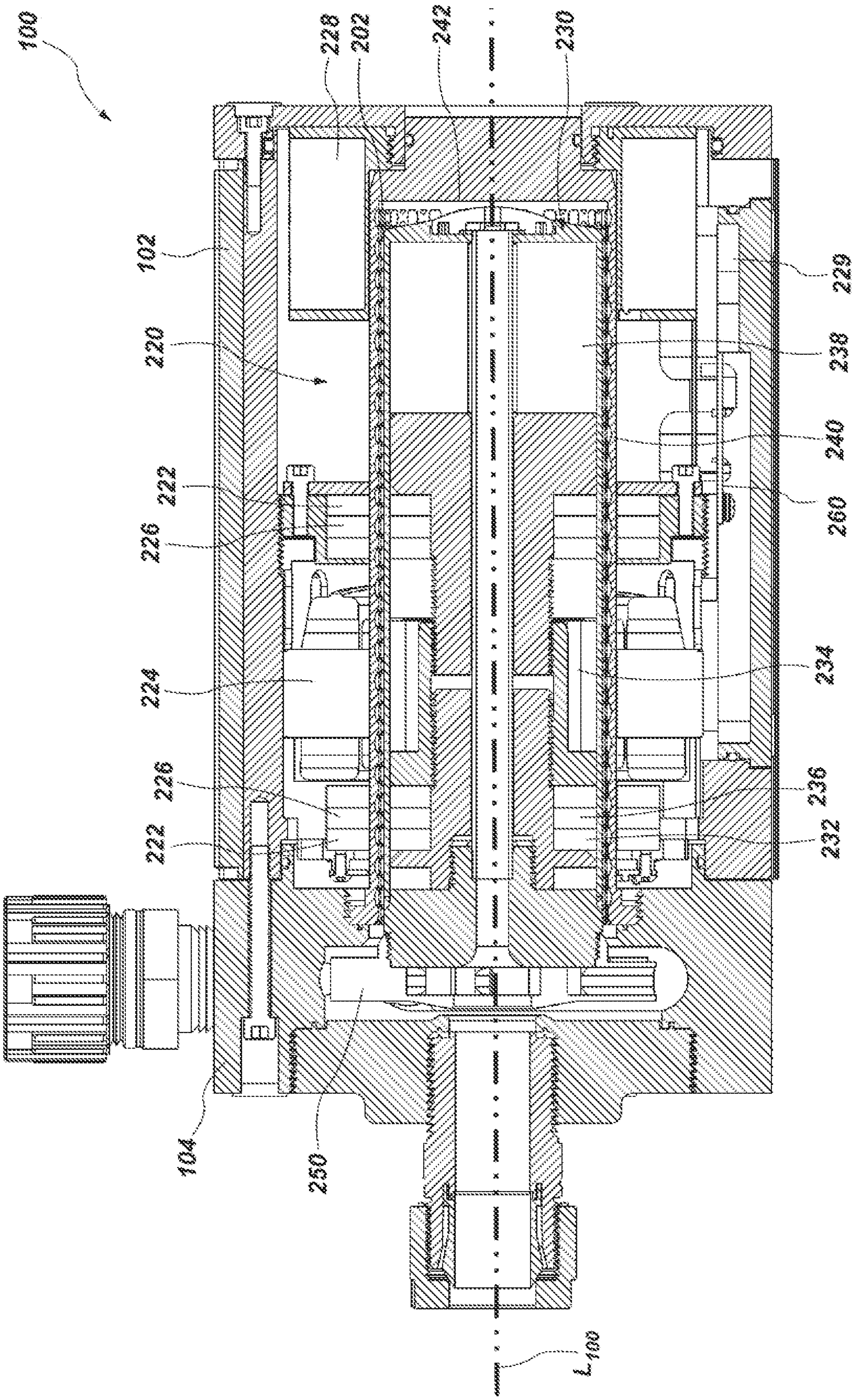
FIG. 2 illustrates a cross-sectional view of the mixing device of FIG. 1 in accordance with one or more embodiments of the present disclosure.

FIG. 2 illustrates a cross-sectional view of the mixing device 100. The body 102 may enclose a stator assembly 220 and a rotor assembly 230. The rotor assembly 230 may be disposed within the stator assembly 220 the rotor assembly 230 and the stator assembly 220 may define a mixing chamber 202 between the rotor assembly 230 and the stator assembly 220. As described in further detail below, the rotor assembly 230 may be configured to rotate relative to the stator assembly 220 and generate a mixing action in the mixing chamber 202 between the stator assembly 220 and the rotor assembly 230.

The stator assembly 220 may include one or more permanent magnets 222 and one or more drive magnets 224. The drive magnets 224 may be, for example, electromagnets, windings, a commutator, a coil, an armature, etc. configured to generate a magnetic field around the rotor assembly 230. The one or more permanent magnets 222 may be substantially annular (e.g., ring shaped, circular, etc.). The permanent magnets 222 may rest against spacers 226 (e.g., shims, annular rings, etc.). The stator assembly 220 may further include a pull magnet 228 and a lift magnet 229. The pull magnet 228 and the lift magnet 229 may be configured to control or maintain a position of the rotor assembly 230 relative to the stator. In some embodiments, at least one of the pull magnet 228 and the lift magnet 229 may be an electromagnet. In some embodiments, at least one of the pull magnet 228 and the lift magnet 229 may be a permanent magnet.

The rotor assembly 230 may include one or more complementary permanent magnets 232, an armature 234, spacers 236, and a complementary pull magnet 238. The complementary permanent magnets 232 and the armature 234 may be substantially annular in shape. The armature 234 may be, for example, a coil, windings, a conductor, a permanent magnet, etc. configured to generate a rotational force on the rotor assembly 230 from the magnetic field generated by the drive magnets 224. The complementary permanent magnets 232 may be substantially aligned with the permanent magnets 222 of the stator assembly 220 in an axial direction, along a longitudinal axis L100. The complementary pull magnet 238 may not be substantially aligned with the pull magnet 228 of the stator assembly 220 in the axial direction.

In some embodiments, the magnetic fields generated by the permanent magnets 222 and the complementary permanent magnets 232 may form passive bearings (e.g., magnetic bearings, contactless bearings, etc.). For example, the permanent magnets 222 and the complementary permanent magnets 232 may be configured to induce a repelling force between the permanent magnets 222 and the complementary permanent magnets 232. The repelling force may cause the rotor assembly 230 to float within the stator assembly 220, such that the rotor assembly 230 does not physically contact the stator assembly 220 at any point. Such contactless interaction may reduce frictional losses within the motor. The contactless interaction may further enable the space created between the rotor assembly 230 and the stator assembly 220 to form the mixing chamber 202 enabling fluid to flow through the mixing chamber 202 in the space between the rotor assembly 230 and the stator assembly 220.

In some embodiments, at least one of the permanent magnets 222 and the complementary permanent magnets 232 may be formed from a relatively high strength magnetic material. The high strength magnetic material may have a maximum energy product of at least about 5 MGOe, such as at least about 42 MGOe, at least about 52 MGOe. In some embodiments, at least one of the permanent magnets 222 and the complementary permanent magnets 232 may be formed from a magnetic material such as, alnico (e.g., alloys of aluminum, nickel, and cobalt), neodymium alloys, or samarium cobalt alloys.

In some embodiments, the pull magnet 228 and the complementary pull magnet 238 may be configured to control the axial position of the rotor assembly 230 with respect to the stator assembly 220. For example, the pull magnet 228 may be configured to induce a force in the axial direction on the complementary pull magnet 238, as described in more detail below with respect to FIG. 4. The pull magnet 228 and the complementary pull magnet 238 may be controlled by an electronic controller. For example, a controller 260 may be housed within the stator assembly 220. An example of a controller and control system for the pull magnet 228 and the complementary pull magnet 238 is described in U.S. patent application Ser. No. 16/779,944, filed on Feb. 3, 2020, and titled PUMP HAVING MAGNETS FOR JOURNALING AND MAGNETICALLY AXIALLY POSITIONING ROTOR THEREOF, AND RELATED METHODS, the disclosure of which is incorporated herein in its entirety by this reference. In some embodiment, the electronic controller may be positioned externally (e.g., separate from the stator assembly 220).

The rotor assembly 230 and/or the stator assembly 220 may include an uneven surface 240. The uneven surface 240 may be configured to generate turbulent flow in the fluid within the mixing chamber 202 as the rotor assembly 230 rotates relative to the stator assembly 220. As used herein, an uneven surface may be a rough surface (e.g., not smooth) that may include multiple raised and/or recessed features, such as ridges, bumps, divots, dimples, channels, etc., formed in the surface to interrupt a relatively planar or smooth surface. As described in further detail below, the uneven surface 240 may include a pattern of recesses (e.g., channels or divots) or raised elements (e.g., bumps or ridges). As the rotor assembly 230 rotates relative to the stator assembly 220, the features of the uneven surface 240 may interact with the fluid in the mixing chamber 202 generating vortices and turbulence and mixing any fluids present in the mixing chamber 202.

In some embodiments, both an outer surface of the rotor assembly 230 and an inner surface of the stator assembly 220 may include the uneven surface 240. In some embodiments, the features of the uneven surface 240 on the outer surface of the rotor assembly 230 may be different from the features of the inner surface of the stator assembly 220. For example, the outer surface of the rotor assembly 230 may include a pattern of divots, such as divots similar to the surface of a golf ball, and the inner surface of the stator assembly 220 may include a series of linear ridges and channels. In some embodiments, only one of the outer surface of the rotor assembly 230 and the inner surface of the stator assembly 220 may include the uneven surface 240.

In some embodiments, an additional feature 250, such as a mixing blade, impeller, fins, etc., may be connected (e.g., attached, coupled, etc.) to the rotor assembly 230, such that any rotation of the rotor assembly 230 is imparted to the additional feature 250 and/or any rotation of the additional feature 250 is imparted to the rotor assembly 230. Examples of the additional feature 250 and connections thereto are described in U.S. patent application Ser. No. 16/779,944, filed on Feb. 3, 2020, and titled PUMP HAVING MAGNETS FOR JOURNALING AND MAGNETICALLY AXIALLY POSITIONING ROTOR THEREOF, AND RELATED METHODS, the disclosure of which has been incorporated herein in its entirety by reference.

The mixing device 100 may be used with an external pumping device configured to generate flow through the mixing device 100. The mixing device 100 may include an impeller or other pumping element configured to assist in the mixing process and may assist the fluid flow within the mixing device 100. The mixing device may not be the main source of pumping power to prevent pockets of gas such as bubbles remaining within the fluid after the fluid passes through the mixing chamber 202 from causing an air lock or vapor lock condition at the impeller or pumping element. An air lock condition may substantially prevent more fluid from entering the area with the impeller or other pumping element and may result in damage due to excess heat and/or cavitation.

In some embodiments, energy may be transferred between the armature 234 and the drive magnets 224 as the rotor assembly 230 rotates relative to the stator assembly 220. For example, electricity may be applied to the drive magnets 224 which may induce a rotational force on the armature 234. The rotational force may cause the rotor assembly 230 to rotate relative to the stator. In another embodiment, rotation of the additional feature 250 may cause the rotor assembly 230 to rotate relative to the stator. As the armature 234 rotates relative to the drive magnets

224, the armature 234 may induce an electrical current in the drive magnets 224 generating electrical energy.

Figure 3:
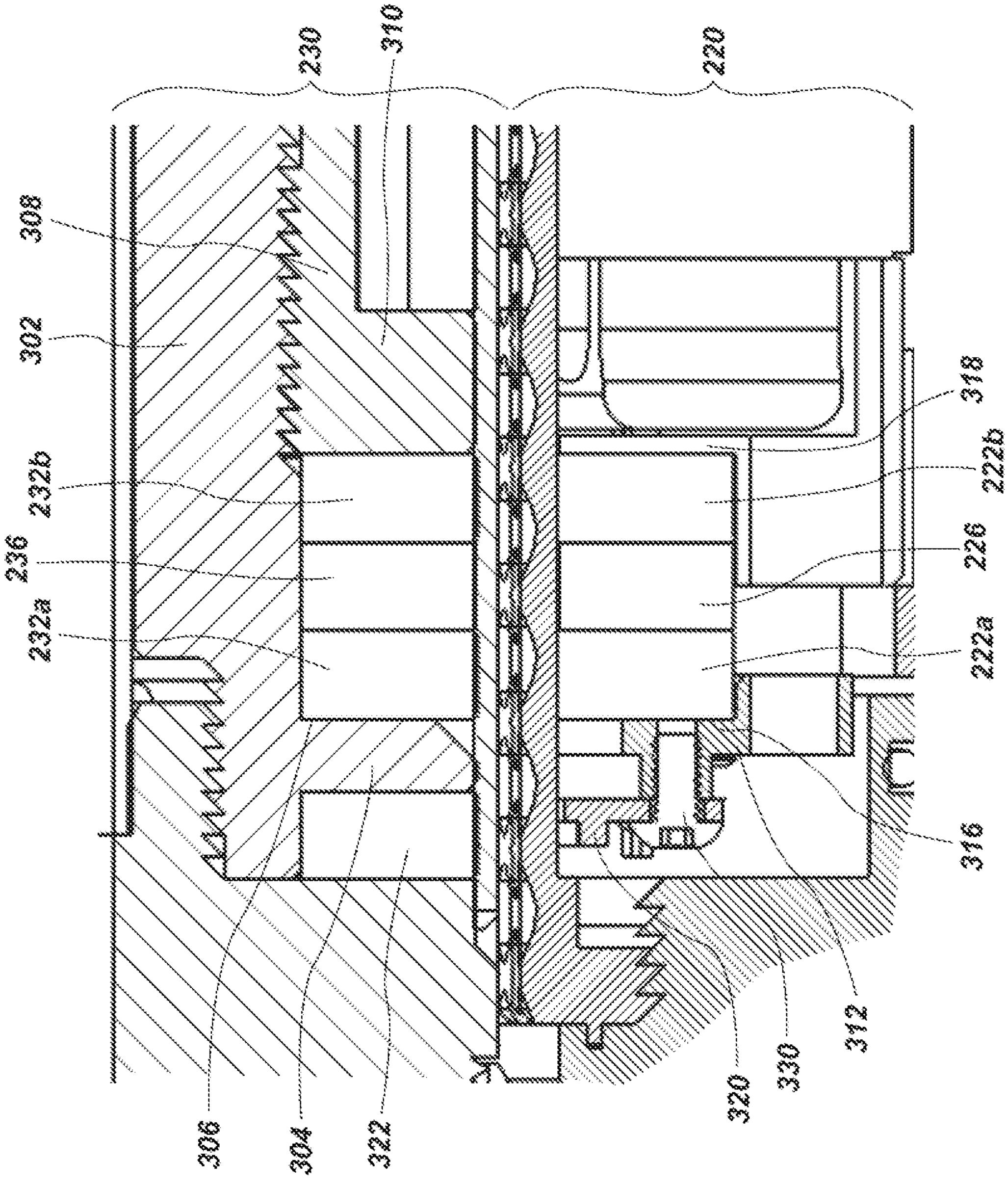
FIG. 3 illustrates an enlarged view of a portion of the cross-sectional view of the mixing device of FIGS. 1 and 2 in accordance with one or more embodiments of the present disclosure.

FIG. 3 illustrates an enlarged view of the permanent magnet 222 and complementary permanent magnet 232 of the embodiment of the mixing device 100 in FIG. 2. The rotor assembly 230 may include multiple structural sections configured to retain and separate different parts of the rotor assembly 230. For example, the rotor assembly 230 may include a front support 302 with a front retaining structure 304 configured to retain the complementary permanent magnets 232 on a first axial end 306. A first complementary permanent magnet 232*a* may be positioned against the front retaining structure 304. The spacer 236 may be positioned between the first complementary permanent magnet 232*a* and a second complementary permanent magnet 232*b*. The second complementary permanent magnet 232*b* may be secured in place by an armature support 308. The armature support 308 may include front central spacer 310 configured to sandwich the first and second complementary permanent magnets 232*a*, 232*b* and the spacer 236 between the front retaining structure 304 and the front central spacer 310.

In some embodiments, the space between the front retaining structure 304 and the front central spacer 310 may be adjustable. For example, the armature support 308 may thread onto the front support 302. In some embodiments, the armature support 308 may be a collar with threads on an inner surface of the armature support 308 that are configured to interface with threads on an exterior surface of the front support 302. In some embodiments, the interfacing surfaces between the front support 302 and the armature support 308 may be relatively smooth, such that the armature support 308 is able to slide axially along the front support 302. The armature support 308 and the front support 302 may clamp the first and second complementary permanent magnets 232*a*, 232*b*, and the spacer 236 between the front retaining structure 304 and the front central spacer 310 with separate hardware (e.g., bolt, screw, stud, spring clamp, screw clamp, etc.).

The permanent magnets 222 in the stator assembly 220 may include a similar retaining structure. For example, the stator assembly 220 may include a front retaining element 312 configured to contact a leading end 316 of a first permanent magnet 222*a* and a secondary front retaining element 318 configured to sandwich a second permanent magnet 222*b* and the first permanent magnet 222*a* as well as the spacer 226 between the front retaining element 312 and the secondary retaining element 318. In some embodiments, the front retaining element 312 and the secondary front retaining element 318 may be clamped together using a bolted connection. In other embodiments, the front retaining element 312 and the secondary front retaining element 318 may be clamped together with a threaded connection, or other connections similar to those outlined above with respect to the armature support 308 and the front support 302. In some embodiments, the front retaining element 312 and the secondary front retaining element 318 may be part of the stator assembly 220. In some embodiments, the front retaining element 312 and the secondary front retaining element 318 may be part of the body 102. In some embodiments, the front retaining element 312 and the secondary front retaining element 318 may be a combination of parts of the body 102 and parts of the stator assembly 220.

In some embodiments, a position sensor 320 may be positioned in the stator assembly 220 substantially aligned with a position indicator 322. In some embodiments, the position indicator 322 may be a permanent magnet. In some embodiments, the position indicator 322 may be another element configured to interact with the position sensor 320, such as a heated element, a reflective element, etc. The position sensor 320 may configured to produce a signal corresponding to an axial position of rotor assembly 230 in relation to stator assembly 220. In some embodiments, the sensor 320 may be a magnetic proximity sensor, a Hall Effect sensor, an ultrasonic sensor, an inductive sensor, a laser sensor, a photo sensor, a capacitive sensor, an infrared sensor, etc. In some embodiments, the controller 260 may monitor the signal from the position sensor 320. The controller 260 may control the axial position of the rotor assembly 230 by adjusting the power to the pull magnet 228 as described in detail below, to adjust the axial force on the rotor assembly 230.

The position sensor 320 may be coupled to the front retaining element 312 through a connection 330. In some embodiments, the connection 330 may be a bolted connection as shown in FIG. 3. In some embodiments, the connection 330 may be an adhesive connection, such as glue or epoxy. In some embodiments, the connection 330 may be a clamped connection, such as a spring clamp, a bolted clamp, etc. The controller 260 may compare readings from the position sensor 320 to defined thresholds. In some embodiments, the threshold values may be defined in positions such that the alarms may stop operation of the mixing device 100 before damage occurs. The controller 260 may be configured to control the axial position of the rotor assembly 230 to within about 0.5 mm, or even within about 0.25 mm.

Figure 4:
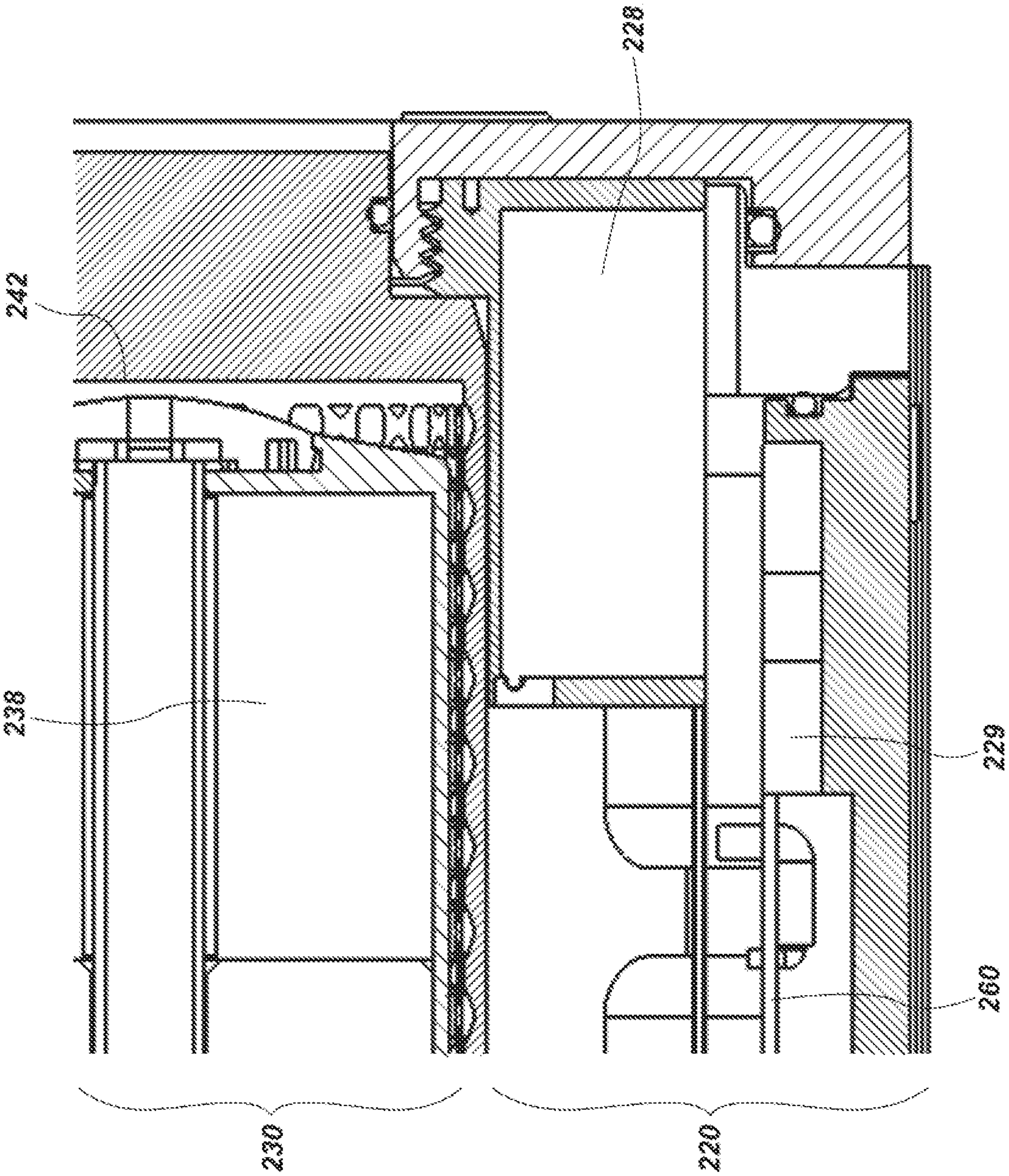
FIG. 4 illustrates an enlarged view of a portion of the cross-sectional view of the mixing device of FIGS. 1, 2, and 3 in accordance with one or more embodiments of the present disclosure.

FIG. 4 illustrates an enlarged view of the pull magnet 228 and the complementary pull magnet 238 of the embodiment of the mixing device 100 shown in FIG. 2. The magnetic fields generated by the pull magnet 228 and the complementary pull magnet 238 may generate an axial force on the rotor assembly 230. The pull magnet 228 may be an electromagnet such that the axial force may be adjusted to maintain the rotor assembly 230 in a desired axial position. For example, the pull magnet 228 may generate an increased axial force toward rear housing surface 242 if the rotor assembly 230 and complementary pull magnet 238 move in an axial direction away from rear housing surface 242. Alternatively, the pull magnet 228 may decrease the axial force or even induce a repelling force pushing the complementary pull magnet 238 and rotor assembly 230 away from rear housing surface 242, if the rotor is too close or touching rear housing surface 242. In some embodiments, rear housing surface 242 may be a hard stop configured to maintain the axial position of the rotor assembly 230 within tolerances, such that damage to components of the rotor assembly 230 is substantially prevented.

In some embodiments (e.g. when the mixing device 100 is installed with the axis of the stator in the vertical direction), lift magnet 229 may not be part of the assembly. In other embodiments (e.g. when the mixing device 100 is installed with the axis of the stator in the horizontal plane), lift magnet 229 may be a permanent magnet configured to repel the complementary pull magnet 238. The lift magnet 229 may be positioned at an end of the stator assembly 220 near pull magnet 238. The lift magnet 229 may introduce a load on the rotor assembly 230. The load may increase as the complementary pull magnet 238 travels radially down in the direction of gravity and decrease as the complementary pull magnet 238 travels radially up in the direction of gravity.

Figure 5:
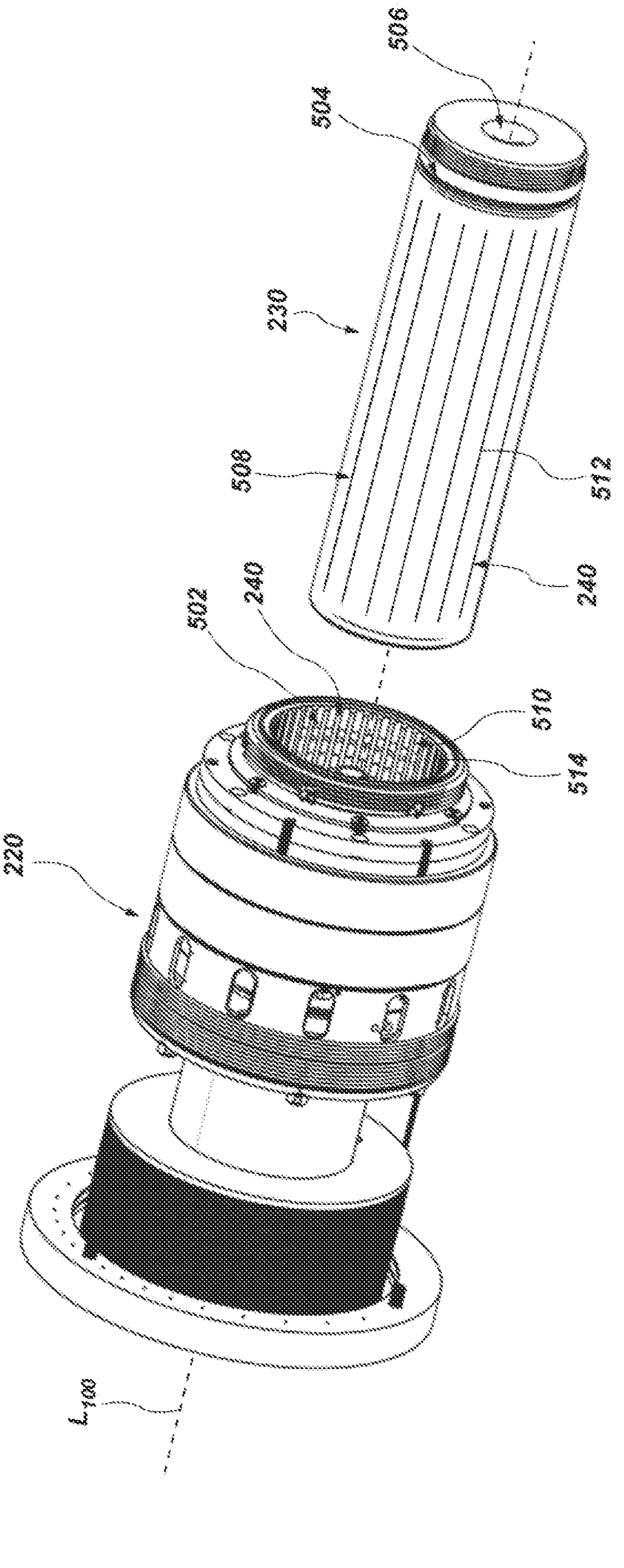
FIG. 5 illustrates a perspective exploded view of a rotor and stator of the mixing device of FIGS. 1-5 in accordance with one or more embodiments of the present disclosure.

FIG. 5 illustrates an exploded view of the mixing device 100. The stator assembly 220 and rotor assembly 230 may be substantially coaxial about the axis L100. The rotor assembly 230 may be configured to be at least partially disposed into a bore 502 defined by the stator assembly 220.

The rotor assembly 230 may be configured to rotate within the bore 502 of the stator assembly 220. As discussed above, an outer surface 508 of the rotor assembly 230 may include an uneven surface 240. The uneven surface 240 may include a pattern of uneven features 512, such as linear features (e.g., linear channels or linear ridges), dimples, divots, bumps, etc., arranged about the outer surface 508 of the rotor assembly 230. An inner surface 510 of the stator assembly 220 may also include an uneven surface 240. The uneven surface 240 of the stator assembly 220 may also include a pattern of uneven features 514, such as linear ridges and/or channels, dimples, divots, bumps, etc., arranged about the inner surface 510 of the stator assembly 220.

The rotor assembly 230 may include an inlet 506 near a first end 504 of the rotor assembly 230. The inlet 506 may allow a fluid to enter the rotor assembly 230 through the first end 504 of the rotor assembly 230. The fluid may pass through a path through a central region of the rotor assembly 230 before passing through the mixing chamber 202 formed within the bore 502 of the stator assembly 220 between the outer surface 508 of the rotor assembly 230 and the inner surface 510 of the stator assembly 220. In some embodiments, the fluid entering the inlet 506 may include both of the fluids to be mixed in the mixing chamber 202. In other embodiments, the mixing device 100 may include a second inlet configured to receive the second fluid.

Figure 6:
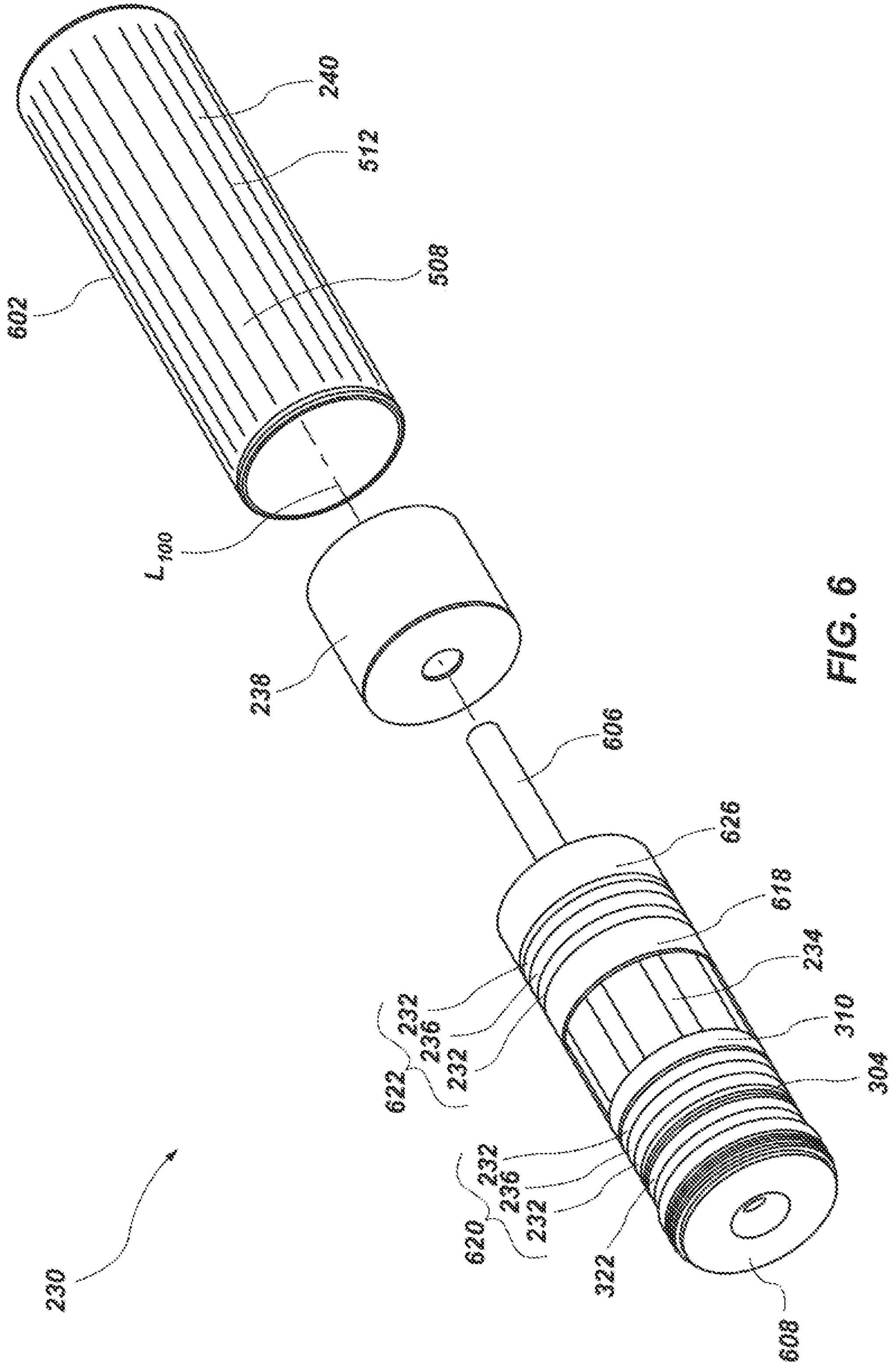
FIG. 6 illustrates a perspective exploded view of the rotor in accordance with the one or more embodiments illustrated in FIG. 5.

FIG. 6 illustrates a partially exploded view of the rotor assembly 230. The rotor assembly 230 may be encased within a shell 602. The shell 602 may also provide the outer surface 508 of the rotor assembly 230 over which the fluids may flow without directly contacting internal components of the rotor assembly 230. In some embodiments, the shell 602 may be formed from a non-ferrous material such as, a polymer (e.g., polytetrafluoroethylene (PTFE), polyvinylchloride (PVC), etc.), a non-ferrous metal (e.g., aluminum, copper, stainless steel, etc.), etc. In some embodiments, the shell 602 may be formed from a corrosion resistant material (e.g., polymers, aluminum, etc.) or have a corrosion resistant coating (e.g., rubber coating, polymer coating, etc.).

As described above, the outer surface 508 of the shell 602 may be an uneven surface 240 including a pattern of uneven features 512, such as raised features, recessed features, etc. In some embodiments, the outer surface 508 of the shell 602 may be a substantially smooth surface. For example, the mixing chamber 202 may rely on an uneven surface 240 on the inner surface 510 of the stator assembly 220 and/or friction forces between the moving outer surface 508 of the shell 602 and the fluids to induce turbulence in the fluids in the mixing chamber 202.

The rotor assembly 230 may be concentrically assembled over a central shaft 606. In some embodiments, the central shaft 606 may be hollow. For example, the central shaft 606 may define an opening, passage, or pathway through a longitudinal length of the shaft 606. The fluid may flow through the central shaft. For example, the fluid may circulate around the outer surface 508 of the shell 602 and then through the central shaft 606 or the fluid may first pass through the central shaft 606 and then exit around the outer surface 508 of the shell 602.

The central shaft 606 may be connected (e.g., attached, coupled, etc.) to a front connecting element 608. In some embodiments, the central shaft 606 may be attached to the front connection element 608 with hardware (e.g., screws, bolds, studs, rivets, pins, etc.). In some embodiments, the central shaft 606 may be attached to the front connecting element 608 with an adhesive (e.g., glue, epoxy, etc.), weld, or solder. In some embodiments, the central shaft 606 may be attached to the front connecting element 608 through an interference fit (e.g., press fit, friction fit, etc.). In some embodiments, the central shaft 606 may be formed as part of the front connecting element 608. For example, the central shaft 606 may be extruded or drawn from the front connecting element 608, or the front connecting element 608 and the central shaft 606 may be formed in a process such as forging or molding. In some embodiments, the central shaft 606 may be attached to the front connecting element 608 through a combination of several attachment means. In some embodiments, the shell 602 may be configured to connect to the front connecting element 608 by welding, gluing, a threaded connection, mechanical fasteners, etc.

Following the front connecting element 608, the rotor assembly 230 may include a pattern of complementary permanent magnets 232 and spacers 236. The complementary permanent magnets 232 may be configured to interact with the corresponding permanent magnets 222 in the stator assembly 220 (FIGS. 2 and 9) to form magnetic bearings. The spacers 236 may be configured to position the complementary permanent magnets 232 in the correct axial position and maintain the complementary permanent magnets 232 in position once the rotor assembly 230 is assembled. The spacers 236 may have different thicknesses at different locations to define the correct axial positions of the complementary permanent magnets 232. The complementary permanent magnets 232 and spacers 236 may be arranged to form a front magnetic bearing assembly 620 and a rear magnetic bearing assembly 622. Each of the front magnetic bearing assembly 620 and the rear magnetic bearing assembly 622 may include at least one complementary permanent magnet 232 and at least one spacer 236. In some embodiments, the front magnetic bearing assembly 620 may include at least two complementary permanent magnets 232 separated by at least one spacer 236. Similarly, the rear magnetic bearing assembly 622 may include at least two complementary permanent magnets 232 separated by at least one spacer 236. In another embodiment, at least one of the front magnetic bearing assembly 620 and the rear magnetic bearing assembly 622 may include at least three complementary permanent magnets 232 separated by at least two spacers 236. In some embodiments, the front magnetic bearing assembly 620 and/or rear magnetic bearing assembly 622 may include additional complementary permanent magnets 232, such as four, five, six, or more complementary permanent magnets 232. Similarly, the front magnetic bearing assembly 620 and/or rear magnetic bearing assembly 622 may include additional spacers 236, such as three, four, five, six, or more spacers 236.

In some embodiments, adjacent complementary permanent magnets 232 in one or more of the front magnetic bearing assembly 620 and the rear magnetic bearing assembly 622 may be oriented with opposing polarities such that the adjacent complementary permanent magnets 232 induce a repulsive force between the adjacent complementary permanent magnets 232 in the rotor assembly 230 pushing the complementary permanent magnets 232 against the front and/or rear central spacers 310, 618 and/or the front and/or rear retaining structure 304, 626. In some embodiments, adjacent complementary permanent magnets 232 in one or more of the front magnetic bearing assembly 620 and the rear magnetic bearing assembly 622 may be oriented with the same polarities such that the adjacent complementary permanent magnets 232 induce an attracting force between the adjacent complementary permanent magnets 232 in the rotor assembly 230 pulling the complementary permanent magnets 232 against the spacer 236 between the adjacent complementary permanent magnets 232.

The position indicator 322 may be positioned on an end of one of the front magnetic bearing assembly 620 and the rear magnetic bearing assembly 622. For example, the position indicator 322 may be positioned ahead of the front magnetic bearing assembly 620, between the front magnetic bearing assembly 620 and the front connecting element 608. The position indicator 322 may be configured to interact with the position sensor 320 in the stator assembly 220 (FIG. 3).

The armature 234 may be disposed between two central spacers 310, 618. The front central spacer 310 may be positioned between the armature 234 and the front magnetic bearing assembly 620. A rear central spacer 618 may be positioned between the armature 234 and the rear magnetic bearing assembly 622. The assembly of front and rear magnetic bearing assemblies 620, 622, central spacers 310, 618, and the armature 234 may be secured between the front retaining structure 304 and a rear retaining structure 626.

The armature 234 may be configured to convert magnetic impulses provided by the stator assembly 220 (FIG. 5) into rotation. The armature 234 may be secured to the rotor assembly 230 in such a way that the rotation of the armature 234 may also rotate the entire rotor assembly 230. In some embodiments, the armature 234 may be secured to the central shaft 606 such that the rotation of the armature 234 is transmitted directly to the central shaft 606 and the central shaft transmits the rotation to the front connecting element 608 and other rotating elements. In some embodiments, the armature 234 may be secured to at least one of the front central spacer 310 and the rear central spacer 618 which may be connected to the corresponding front and/or rear magnetic bearing assembly 620, 622. The front and/or rear magnetic bearing assemblies 620, 622 may be connected to the respective front or rear retaining structure 304, 626. The front retaining structure 304 may be connected to at least one of the central shaft 606 and/or the front connecting element 608 and the rear retaining structure 626 may be connected to the central shaft 606. In such an embodiment, the armature 234 may transmit the rotation through the series of interconnected parts to the central shaft 606 and/or the front connecting element 608.

The rotor assembly 230 may include a complementary pull magnet 238 located behind (e.g., to the rear, following, etc.) the rear retaining structure 626. The complementary pull magnet 238 may be configured to interact with at least one corresponding pull magnet 228 (FIGS. 2 and 9) in the stator assembly 220 (FIG. 5) to maintain and/or correct an axial position of the rotor assembly 230 within the stator assembly 220. In some embodiments, the complementary pull magnet 238 may be secured to the central shaft 606. In some embodiments, the complementary pull magnet 238 may be secured to the rear retaining structure 626. In some embodiments, the complementary pull magnet 238 may be secured to the rotor assembly 230 by the shell 602.

In some embodiments, the rotor assembly 230 may be configured to be disassembled and reassembled with ease, such that individual components, such as the complementary permanent magnets 232, spacers 236, armature 234, complementary pull magnet 238, etc., may be removed and replaced when necessary. For example, the individual components may be replaced when the individual component is worn, broken, or otherwise defective. In some embodiments, the rotor assembly 230 may be configured to be replaced as a unit. For example, the rotor assembly 230 may be removed from the stator assembly 220 (FIG. 5) and a replacement rotor assembly 230 may be inserted in its place. In some embodiments, the rotor assembly 230 may be both replaceable as a unit and rebuildable.

Figure 7:
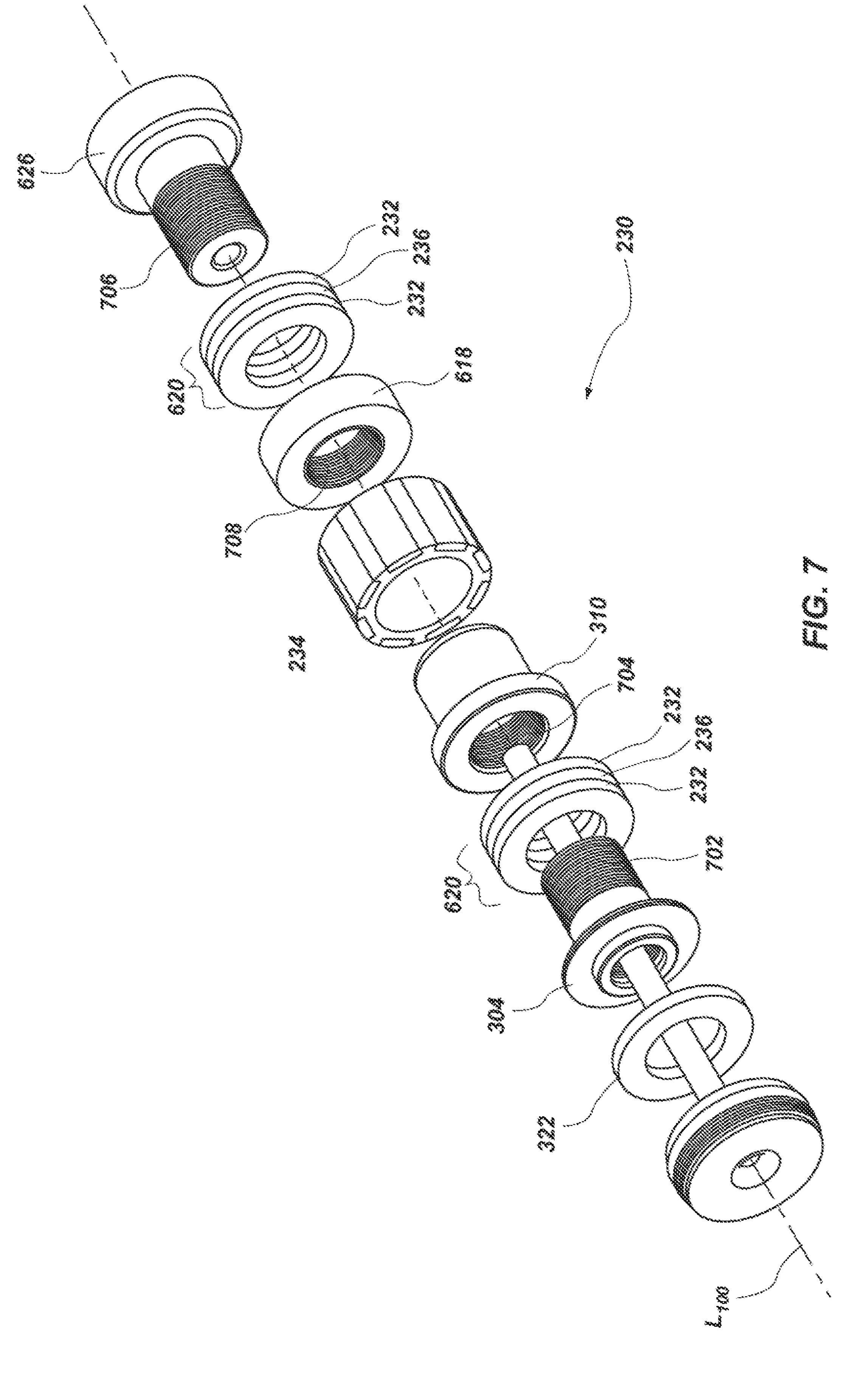
FIG. 7 illustrates a perspective exploded view of the rotor in accordance with the one or more embodiments illustrated in FIGS. 5 and 6.

FIG. 7 illustrates an exploded view of a portion of the rotor assembly 230 illustrated in FIG. 6. The front retaining structure 304 may include an external interfacing structure 702 such as threads (e.g., pipe threads, machine threads, etc.), grooves, ridges, tabs, etc. configured to interface with a complementary internal interfacing structure 704 in the front central spacer 310. The complementary internal interfacing structure 704 may be configured to receive the external interfacing structure 702 of the front retaining structure 304 securing the front retaining structure 304 to the front central spacer 310.

The distance between the front retaining structure 304 and the front central spacer 310 may be defined by the interface between the external interfacing structure 702 and the complementary internal interfacing structure 704. In some embodiments, the distance between the front retaining structure 304 and the front central spacer 310 may be constant (e.g., the distance remains the same each time the rotor assembly 230 is assembled regardless of a size of the front magnetic bearing assembly 620). In some embodiments, the distance between the front retaining structure 304 and the front central spacer 310 may be adjustable. For example, a threaded interface between the external interfacing structure 702 and the complementary internal interfacing structure 704 may allow the distance between the front retaining structure 304 and the front central spacer 310 to change as the front retaining structure 304 is threaded into or out of the front central spacer 310.

The rear retaining structure 626 may also include an external interfacing component 706. In some embodiments, the rear central spacer 618 may include a complementary internal interfacing component 708 configured to interface with the external interfacing component 706. In some embodiments, the external interfacing component 706 may be configured to interface with the internal interfacing structure 704 of the front central spacer 310.

The distance between the rear retaining structure 626 and the rear central spacer 618 may be defined by the interface between the external interfacing component 706 and the complementary internal interfacing component 708. In some embodiments, the distance between the rear retaining structure 626 and the rear central spacer 618 may be constant (e.g., the distance remains the same each time the rotor assembly 230 is assembled regardless of a size of the rear magnetic bearing assembly 622). In some embodiments, the distance between the rear retaining structure 626 and the rear central spacer 618 may be adjustable, such as with a threaded interface.

The distance between the rear retaining structure 626 and the front central spacer 310 may be defined by the interface between the external interfacing component 706 and the complementary internal interfacing structure 704. In some embodiments, the distance between the rear retaining structure 626 and the front central spacer 310 may be constant (e.g., the distance remains the same each time the rotor assembly 230 is assembled regardless of a size of the rear magnetic bearing assembly 622 combined with the rear central spacer 618 and the armature 234). In some embodiments, the distance between the rear retaining structure 626 and the front central spacer 310 may be adjustable, such as with a threaded interface.

In some embodiments, the interface between the external interface component 706 of the rear retaining structure 626 and the complementary internal interface component 708 of the rear central spacer 618 may be a floating connection. For example, the rear central spacer 618 may be slidably connected to the rear retaining structure 626 such that the rear central spacer 618 may move axially relative to the rear retaining structure 626. The distance between the rear retaining structure 626 and the rear central spacer 618 may be defined by intermediary components between the rear retaining structure 626 and the front central spacer 310, such as the armature 234 and/or the rear magnetic bearing assembly 622.

Figure 8:
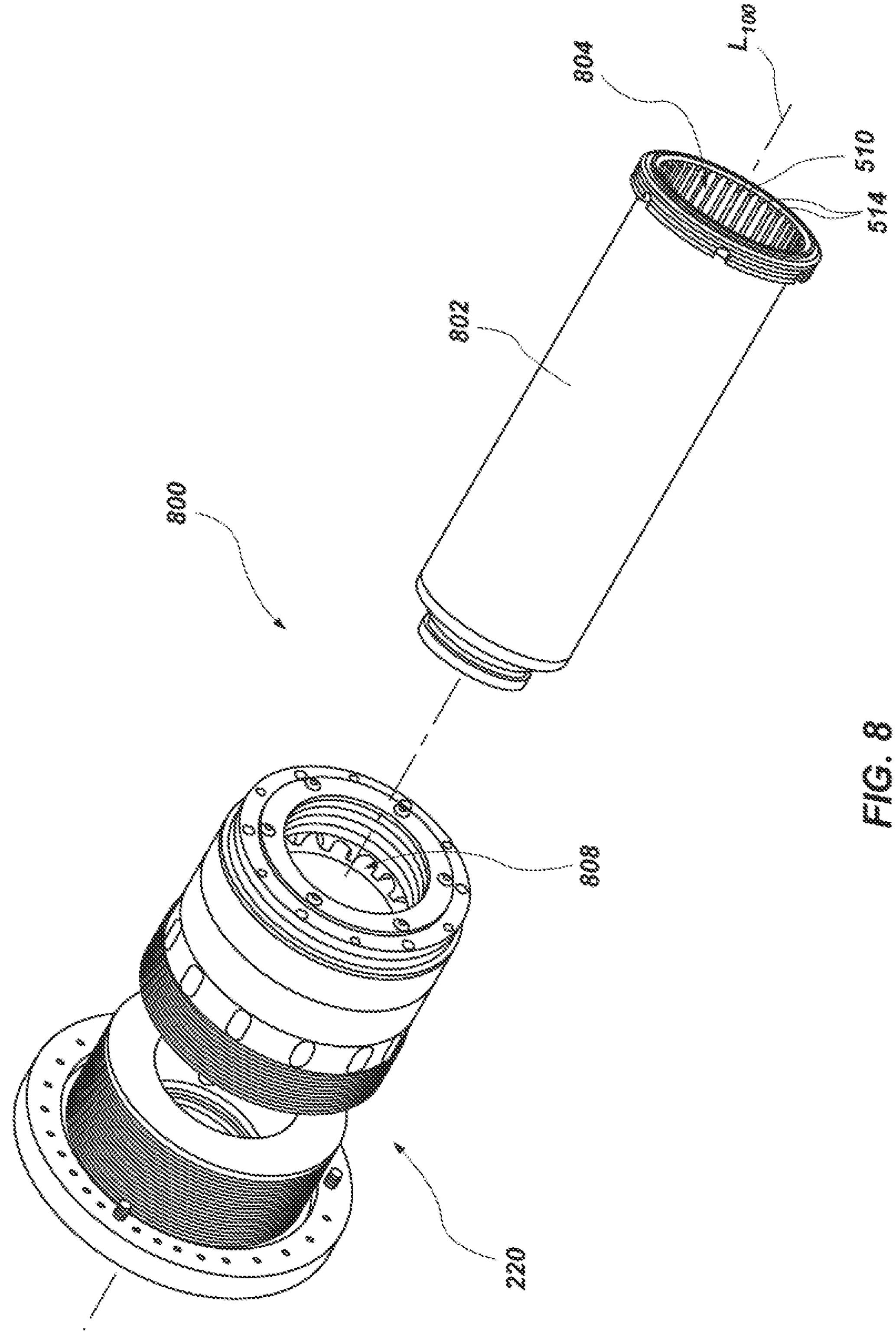
FIG. 8 illustrates a perspective exploded view of the stator in accordance with the one or more embodiments illustrated in FIG. 5.

FIG. 8 illustrates an exploded view of a stator assembly 800 and a stator sleeve 802 (e.g., housing, isolator, wall, etc.). The stator sleeve 802 is secured to the pump housing and configured to be disposed between the rotor assembly 230 (FIG. 5) and the stator assembly 800. The rotor assembly 230 may be inserted into a bore 804 of the stator sleeve 802. In some embodiments, the bore 804 may be sized to provide a clearance fit (e.g., slightly larger, a small percentage larger, etc.) to the rotor assembly 230. For example, the bore 804 may be sized such that an internal diameter of the bore 804 is between about 5 μm and about 5 mm larger than an external diameter of the rotor assembly 230 such as between about 2 mm and about 4 mm larger. The difference between the internal diameter of the bore 804 and the external diameter of the rotor assembly 230 may define the mixing chamber 202 (FIG. 2).

The stator sleeve 802 may include a pattern of uneven features 514 (e.g., dimples, ridges, vanes, grooves, fins, etc.) on the inner surface 510 (e.g., surface facing the rotor assembly 230 (FIG. 5)) of the stator sleeve 802. The patterns on the inner surface 510 may induce turbulent flow into the fluid that may be present and/or flowing in the mixing chamber 202 defined between the rotor assembly 230 (FIG. 5) and the inner surface 510 of the stator sleeve 802. Turbulent flow may increase the mixing between the fluids in the mixing chamber 202. For example, the turbulent flow may cause the individual fluids to break apart into smaller concentrations (e.g., concentrated groups) increasing the amount of contact between the two fluids and enabling the second fluid (e.g., the gas) to dissipate more fully into the first fluid (e.g., the liquid).

The stator sleeve 802 may be at least partially disposed within the stator assembly 220. The stator sleeve 802 may be configured to isolate the stator assembly 220 from the rotor assembly 230 (FIG. 5). The stator sleeve 802 may be configured to enable fluid to flow around the rotor assembly 230 while substantially preventing the fluid from contacting the stator assembly 220. In some embodiments, the stator sleeve 802 may be configured to shield the stator assembly 220 from contact or debris in the event that a failure occurs with the rotor assembly 230 (e.g., the rotor assembly 230 breaks, the rotor assembly 230 is improperly aligned, etc.). The stator sleeve 802 may be formed from a strong non-ferrous material such as, a polymer (e.g., polytetrafluoroethylene (PTFE), polyvinylchloride (PVC), etc.), a non-ferrous metal (e.g., aluminum, copper, etc.), etc. In some embodiments, the stator sleeve 802 may be formed from a corrosion resistant material (e.g., polymers, aluminum, etc.) or have a corrosion resistant coating (e.g., rubber coating, polymer coating, etc.).

The stator assembly 220 may be formed from an assembly of annular components defining a bore 808 configured to receive the stator sleeve 802. In some embodiments, the annular components of the stator assembly 220 may be mounted (e.g., secured, attached, etc.) to the stator sleeve 802. In some embodiments, the annular components of the stator assembly 220 may be mounted to an external body, housing, or casing (e.g., body 102 (FIG. 1)). In some embodiments, the annular components of the stator assembly 220 may be attached to the other annular components of the stator assembly 220. In some embodiments, the annular components of the stator assembly 220 may be attached to a combination of the elements described above.

Figure 9:
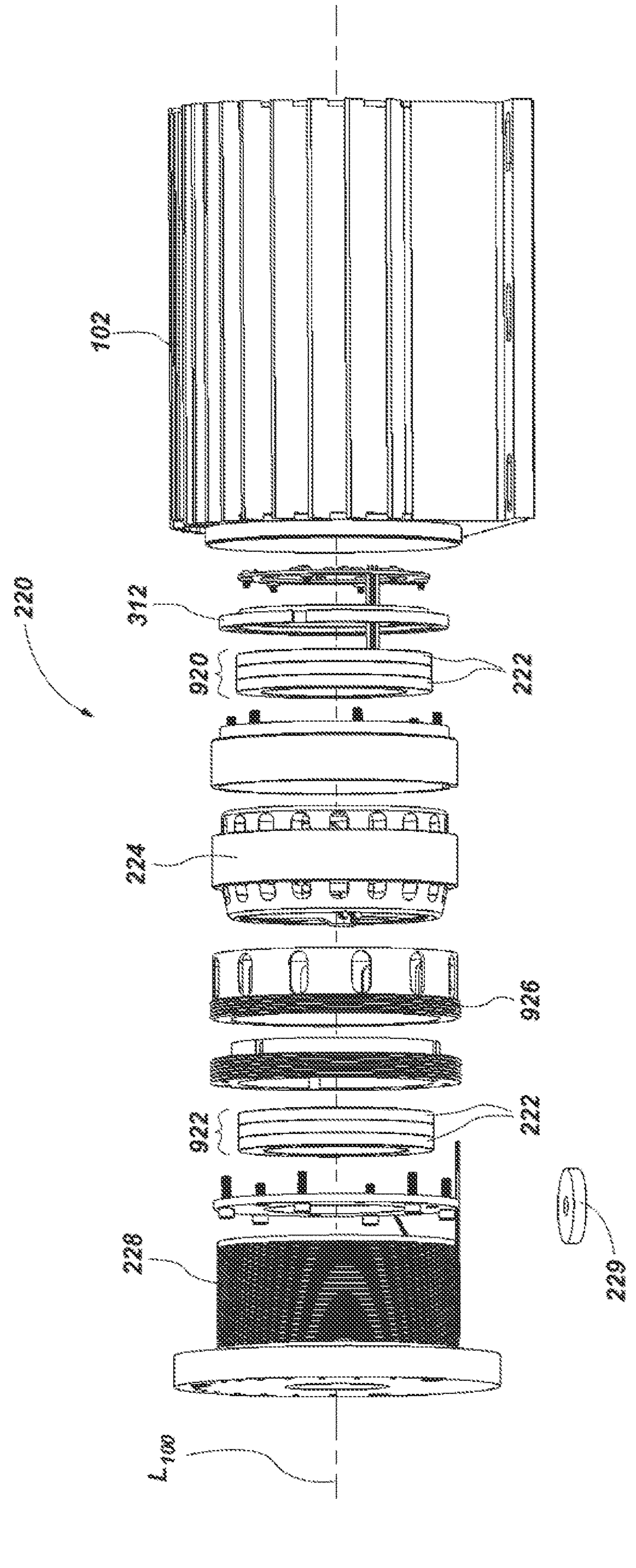
FIG. 9 illustrates a perspective exploded view of the stator in accordance with the one or more embodiments illustrated in FIGS. 5 and 8.

FIG. 9 illustrates an exploded view of the stator assembly 220 of FIG. 8. The annular components of the stator assembly 220 may include a front magnetic bearing assembly 920, a rear magnetic bearing assembly 922, the drive magnets 224, a front retaining element 312, a rear retaining structure 926, and the pull magnet 228. The front magnetic bearing assembly 920 and the rear magnetic bearing assembly 922 may each include at least one permanent annular magnet 222. In some embodiments, the annular components may be positioned using spacers similar to those described above with respect to the rotor assembly 230 shown in FIGS. 6 and 7. In some embodiments, the spacers may be integrated into mounting structure such as the body 102 (FIG. 2).

Referring to FIGS. 6, 8, and 9. The front and rear magnetic bearing assemblies 920, 922 may be configured to interact with the front and rear magnetic bearing assemblies 620, 622 of the rotor assembly 230. For example, the front and rear magnetic bearing assemblies 920, 922 of the stator assembly 220 may be positioned (e.g., spaced) such that each permanent magnet 222 is aligned with the corresponding complementary permanent magnet 232 of the rotor assembly 230. In some embodiments, each permanent magnet 222 may be oriented such that the polarity (e.g., north pole, south pole) of the permanent magnet 222 is aligned with the polarity of the corresponding complementary permanent magnet 232 of the rotor assembly 230, such that a repelling force is induced by the magnetic field between the permanent magnet 222 and the corresponding complementary permanent magnet 232. In some embodiments, each permanent magnet 222 may be oriented such that the polarity of the permanent magnet 222 is opposite the polarity of the corresponding complementary permanent magnet 232 of the rotor assembly 230, such that an attracting force is induced by the magnetic field between the permanent magnet 222 and the corresponding complementary permanent magnet 232. In some embodiments, some of the permanent magnets 222 may be oriented with the polarities aligned with the corresponding complementary permanent magnets 232 of the rotor, while others may be oriented with the polarities opposite the corresponding complementary permanent magnets 232. For example, the permanent magnets 222 of the front magnetic bearing assembly 920 may be oriented with the polarities aligned with the corresponding complementary permanent magnets 232 of the front magnetic bearing assembly 620 of the rotor assembly 230 and the permanent magnets 222 of the rear magnetic bearing assembly 922 may be oriented with the polarities opposite the corresponding complementary permanent magnets 232 of the rear magnetic bearing assembly 622. In another example, each of the front and rear magnetic bearing assemblies 920, 922 may include at least one permanent magnet 222 oriented with the polarity aligned with the corresponding complementary permanent magnet 232 of the rotor assembly 230 and at least one permanent magnet 222 oriented with the polarity opposite the corresponding complementary permanent magnet 232 of the rotor assembly 230.

In some embodiments, adjacent permanent magnets 222 in one or more of the front magnetic bearing assembly 920 and the rear magnetic bearing assembly 922 may be oriented with the same polarities such that the adjacent permanent magnets 222 induce a repulsive force between the adjacent permanent magnets 222 in the stator assembly 220. In some embodiments, adjacent permanent magnets 222 in one or more of the front magnetic bearing assembly 920 and the rear magnetic bearing assembly 922 may be oriented with opposing polarities such that the adjacent permanent magnets 222 induce an attracting force between the adjacent permanent magnets 222 in the stator assembly 220.

The drive magnet assembly 224 may be substantially aligned with the armature 234 of the rotor assembly 230 and configured to interact with the armature 234. For example, an electrical current may be supplied to the drive magnets 224. The drive magnets 224 may generate a magnetic field from the electrical current which may induce a rotational force on the armature 234. The electrical current may originate from an external source (e.g., generator, line power, transformer, inverter, motor controller, variable frequency drive, etc.). In some embodiments, internal circuitry (e.g., control board, motor controller, speed controller, etc.) may modify the electrical current. In some embodiments, the pump may include the controller 260 that may divert some of the electrical current to power and operate the controller 260 and/or other components of the pump. In some embodiments, the controller 260 and other components such as the complementary pull magnet 228 may be powered separately from the pump, such as through an independent power supply. The controller 260 may modify the electrical current (e.g., change amplitude, frequency, voltage, amps, etc.) before sending the electrical current to the drive magnets 224. In some embodiments, the controller 260 may monitor the electrical current being supplied to the drive magnet 224. In some embodiments, the controller 260 may control other components of the pump based on the current being supplied to the drive magnet 224. For example, the controller 260 may monitor the amps being supplied to the drive magnet 224 and may control the current being supplied to the pull magnet 228 based on the amps being supplied to the drive magnet 224.

Figure 10:
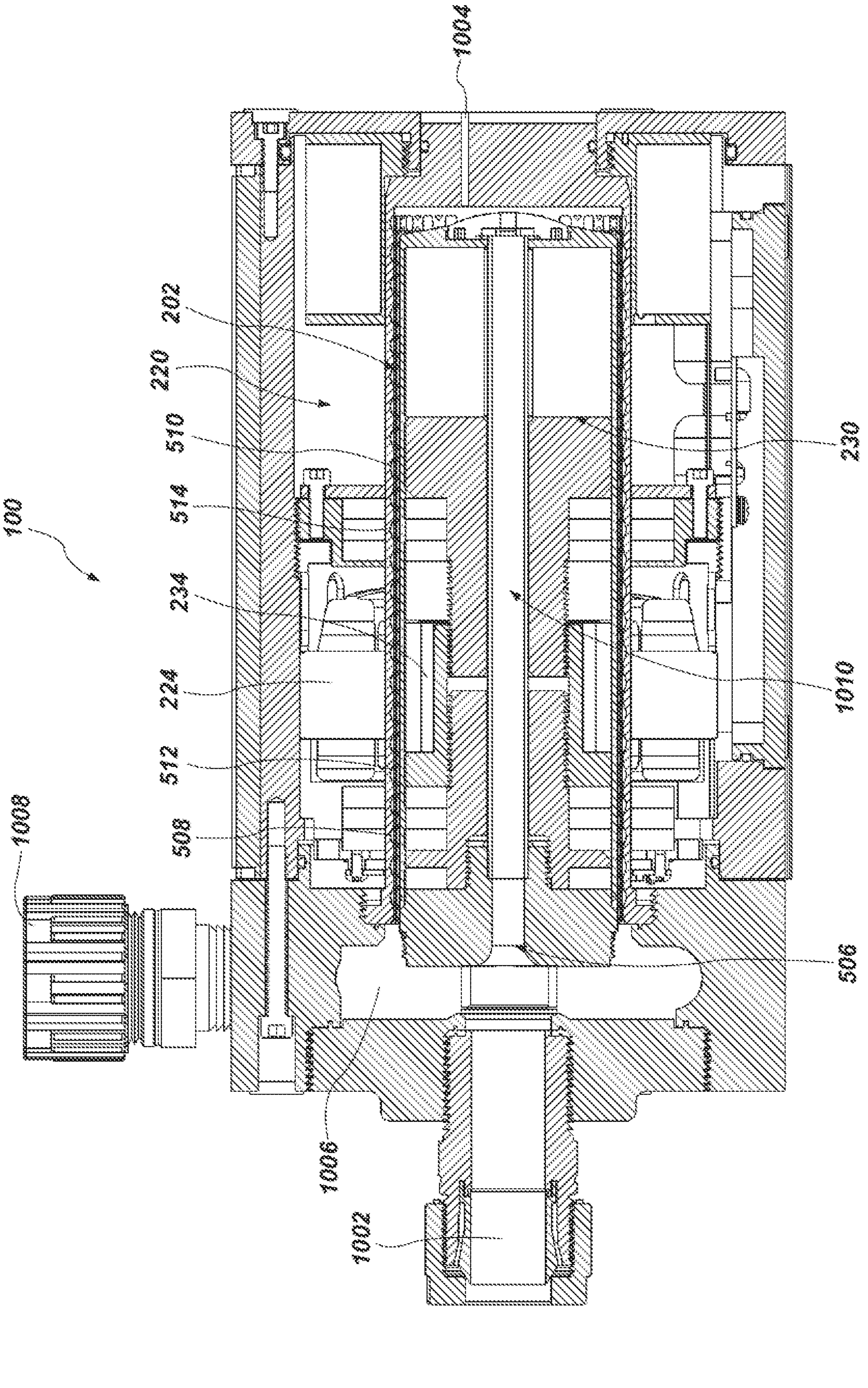
FIG. 10 illustrates a cross sectional view of an embodiment of the mixing device of FIG. 1 in accordance with one or more embodiments of the present disclosure.

FIG. 10 illustrates a cross-sectional view of another embodiment of the mixing device 100. The mixing device 100 may include a primary inlet 1002 and a secondary inlet 1004. The primary inlet 1002 may be configured to receive a first fluid and the secondary inlet 1004 may be configured to receive a second fluid. As illustrated in FIG. 10, the primary inlet 1002 may coincide with the first fluid port 116 of the mixing device 100.

The first fluid may enter the mixing device 100 through the primary inlet 1002. The primary inlet 1002 may be operatively coupled to the inlet 506 of the rotor assembly 230. The first fluid may enter a passage 1010 through the rotor assembly 230 through the inlet 506. The first fluid may pass through a central region of the rotor assembly 230 through the passage 1010 and exit the rotor assembly 230 at a rear portion of the rotor assembly 230.

The second fluid may enter the mixing device 100 through the secondary inlet 1004. The secondary inlet 1004 may be coupled to the mixing chamber 202 in an area of the mixing chamber 202 proximate the rear portion of the rotor assembly 230. Thus, the second fluid may be introduced into the first fluid in the mixing chamber 202 proximate the rear of the rotor assembly 230 as the first fluid exits the passage 1010 through the rotor assembly 230.

The two fluids may then flow through the mixing chamber 202 defined between the rotor assembly 230 and the stator assembly 220 to a collection chamber 1006 proximate a front portion of the rotor assembly 230. The rotor assembly 230 may be configured to rotate relative to the stator assembly 220. As described above, the interaction between the armature 234 and the drive magnets 224 may cause the rotor assembly 230 to rotate relative to the stator assembly 220.

The rotation of the rotor assembly 230 may generate turbulent flow in the two fluids as they pass through the mixing chamber 202 between the rotor assembly 230 and the stator assembly 220. For example, the outer surface 508 of the rotor assembly 230 may induce rotational forces on the fluids in contact with the outer surface 508 of the rotor assembly 230 through friction. As described above, the outer surface 508 of the rotor assembly 230 may include uneven features 512, such as raised features (e.g., ridges or bumps) or recessed features (e.g., channels, divots, or dimples). The uneven features 512 may create greater amounts of turbulence in the two fluids, such as by increasing the frictional forces between the outer surface 508 of the rotor assembly 230 and the fluids and/or creating tripping points configured to transition laminar flow to turbulent flow.

The inner surface 510 of the stator assembly 220 may also aid in inducing turbulent flow into the fluids in the mixing chamber 202. For example, the inner surface 510 of the stator assembly 220 may induce forces into the fluids proximate the inner surface 510 in a direction opposite the direction of rotation of the rotor assembly 230, due to the stator assembly 220 remaining substantially stationary relative to the rotor assembly 230. As described above, the inner surface 510 of the stator assembly 220 may include uneven features 514 that may create larger forces in the fluids, such as by increasing the friction between the fluids and the inner surface 510 of the stator assembly 220 and/or creating tripping points configured to transition laminar flow to turbulent flow.

The rotation of the rotor assembly 230 may create turbulent flow throughout the mixing chamber 202 as the two fluids pass from the rear of the rotor assembly 230 to the collection chamber 1006. The turbulent flow may accelerate the mixing of the two fluids within the mixing chamber 202, such that when the fluids exit the mixing chamber 202 into the collection chamber 1006 the two fluids may form a substantially homogeneous fluid. The accelerated mixing of the two fluids within the mixing chamber 202 may enable a greater amount of the gas to be dissipated into the liquid while maintaining the resulting fluid as a substantially homogeneous fluid.

The substantially homogeneous fluid may then flow out of the collection chamber 1006 through an outlet 1008. As illustrated in FIG. 10, the outlet 1008 may coincide with the second fluid port 118 of the mixing device 100. The flow of the fluids into the mixing device 100 may displace the homogeneous fluid in the collection chamber 1006 causing the homogeneous fluid to exit the mixing device 100 through the outlet 1008. In some embodiments, one or more of the fluids entering the mixing device 100 may be pressurized, such as with a pump or compressor. The pressurized fluid may cause the homogeneous fluid in the collection chamber 1006 to exit the collection chamber 1006 to enable the higher pressure fluids to flow into the collection chamber 1006. In some embodiments, the outlet 1008 may be coupled to equipment configured to generate suction, such as a vacuum or an inlet of a pump. The equipment may draw the substantially homogeneous fluid out of the collection chamber 1006 through the outlet 1008, such that the collection chamber 1006 may continue to receive substantially homogeneous fluid form the mixing chamber 202.

Figure 11:
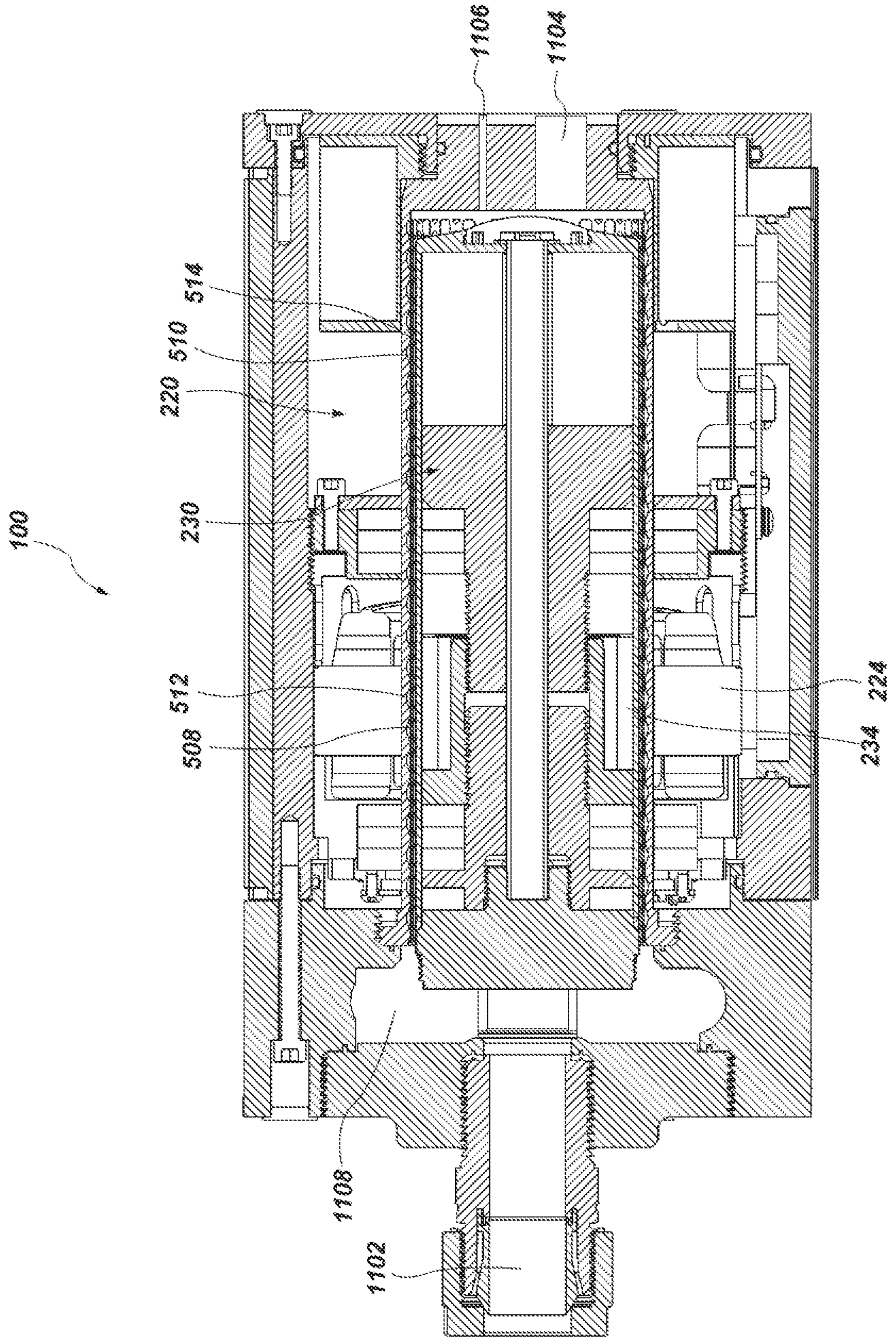
FIG. 11 illustrates a cross sectional view of an embodiment of the mixing device of FIG. 1 in accordance with one or more embodiments of the present disclosure.

FIG. 11, illustrates another embodiment of the mixing device 100. The mixing device 100 may include a primary inlet 1104 and a secondary inlet 1106. The primary inlet 1104 may be configured to receive a first fluid and the secondary inlet 1106 may be configured to receive a second fluid. As illustrated in FIG. 11, the primary inlet 1104 and the secondary inlet 1106 may be positioned on a same side of the rotor assembly 230. For example, the primary inlet 1104 and the secondary inlet 1106 may be positioned proximate the rear of the rotor assembly 230.

The primary inlet 1104 and the secondary inlet 1106 may be configured to flow the first and the second fluids directly into the mixing chamber 202. Introducing each of the fluids near the rear of the rotor assembly 230 may cause the fluids to begin mixing. For example, the fluids may substantially fill the portion of the mixing chamber 202 proximate the rear of the rotor assembly 230, such that the fluids may be in contact with one another and begin mixing together. As the fluids exit the respective primary inlet 1104 and secondary inlet 1106, the fluids may induce vortices and/or turbulent flow near the primary inlet 1104 and the secondary inlet 1106 causing additional mixing. In some embodiments, the primary inlet 1104 and/or the secondary inlet 1106 may be oriented such that the fluids flowing through each of the primary inlet 1104 and the secondary inlet 1106 may intersect as they exit from the primary inlet 1104 and the secondary inlet 1106 into the mixing chamber 202, which may induce additional mixing and turbulence.

The fluids may then flow through the mixing chamber 202 from the rear of the rotor assembly 230 to a collection chamber 1108 proximate a front portion of the rotor assembly 230. As described above, the rotor assembly 230 may rotate relative to the stator assembly 220. The outer surface 508 of the rotor assembly 230 and the inner surface 510 of the stator assembly 220 may induce turbulence into the fluids in the mixing chamber 202 defined between the outer surface 508 of the rotor assembly 230 and the inner surface 510 of the stator assembly 220 through frictional forces between each of the outer surface 508, the inner surface 510, and the fluids. As described above, the turbulence may be enhanced by uneven features 512, 514 that may be present on the outer surface 508 and/or the inner surface 510.

As described above, the turbulence in the mixing chamber 202 may cause the fluids to mix together, such that the fluid exiting the mixing chamber 202 into the collection chamber 1108 may be substantially homogeneous. The substantially homogeneous fluid may exit the collection chamber 1108 through an outlet 1102. The outlet 1102 may be positioned on an opposite end of the mixing device 100 from the primary inlet 1104 and the secondary inlet 1106. For example, the outlet 1102 may coincide with the first fluid port 116 of the mixing device 100. Thus, the two fluids may enter the mixing device 100 through the primary inlet 1104 and the secondary inlet 1106 on a first end of the mixing device 100 proximate the rear of the rotor assembly 230, be mixed together to form a substantially homogeneous fluid in the mixing chamber 202 as the fluid travels the length of the rotor assembly 230, and exit the mixing device 100 through the outlet 1102 at a second opposite end of the mixing device 100 proximate the front portion of the rotor assembly 230.

In some embodiments, the mixing device 100 may be configured to flow the fluids in the opposite direction. For example, the two fluids may enter the mixing device 100 at the second end proximate the front portion of the rotor assembly 230. The two fluids may then enter the mixing chamber 202 at the front portion of the rotor assembly 230 and be mixed together in the mixing chamber 202 as the fluid travels the length of the rotor assembly 230 to the rear of the rotor assembly 230. The fluids may then exit the mixing device 100 through an outlet proximate the rear of the rotor assembly 230 as a substantially homogeneous fluid.

Figure 12A:
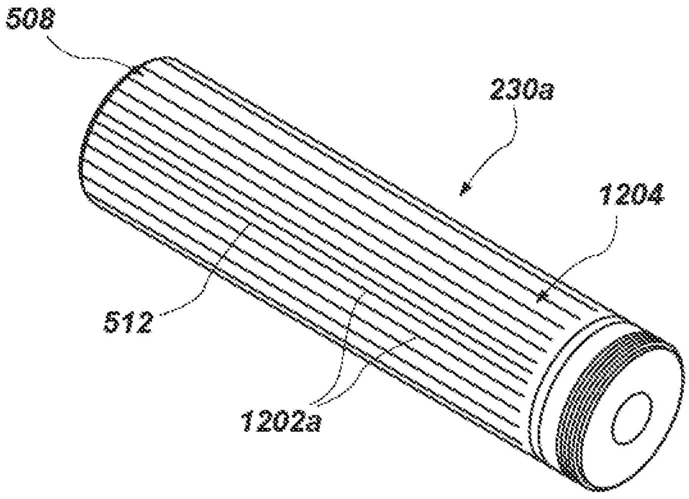
FIGS. 12A-12C illustrate perspective views of embodiments of a rotor associated in accordance with one or more embodiments of the present disclosure.
Figure 12B:
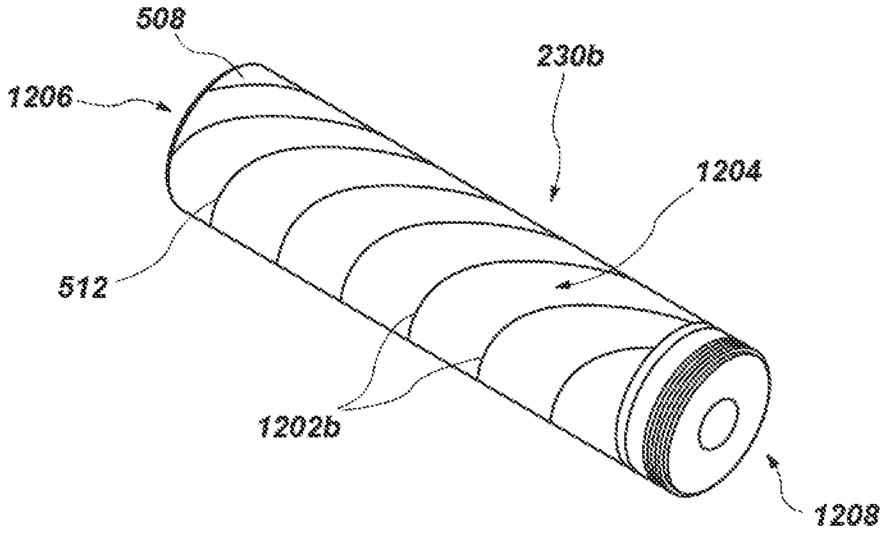
Figure 12C:
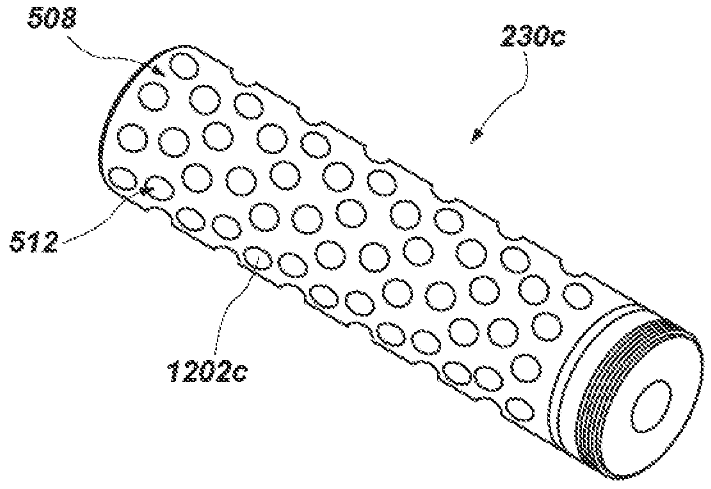

FIGS. 12A-12C illustrate different embodiments of the rotor assembly 230. As described above, the rotor assembly 230 may include uneven features 512 on the outer surface 508 of the rotor assembly 230. FIG. 12A illustrates a rotor assembly 230A including linear features **1202*a*. The linear features 1202*a* may be raised features, such as ridges or recessed features, such as channels. In some embodiments, the linear features 1202*a* may be a combination of raised features and recessed features arranged in a pattern about the outer surface 508 of the rotor assembly 230A**. For example, each raised feature may be adjacent to a recessed feature.

In some embodiments, each of the linear features **1202*a* may be substantially evenly spaced about the outer surface 508 of the rotor assembly 230A. In other embodiments, the spacing between the linear features 1202*a* may vary, such that the spaces 1204 between some adjacent linear features 1202*a* are greater than the spaces 1204 between other adjacent linear features 1202*a*. In some embodiments, the spaces 1204 may be defined by other linear features 1202*a*. For example, the outer surface 508 may include linear ridges defining the linear features 1202*a* and the spaces 1204** between the linear ridges may form linear channels.

In some embodiments, the linear features **1202*a* may be substantially uniform. For example, the linear features 1202*a* may each have substantially the same heights, depths, and/or lengths. In other embodiments, the linear features 1202*a* may have different sizes. For example, some of the linear features 1202*a* may have heights or depths that are greater than others. In some embodiments, some of the linear features 1202*a* may have different lengths than others. For example, some of the linear features 1202*a* may not extend a full length of the rotor assembly 230A. In some embodiments, the linear features 1202*a* may have different shapes. For example, some of the linear features 1202*a* may have rectangular shapes (e.g., defined primarily by 90° angles) and some of the linear features 1202*a* may have triangular shapes (e.g., extending at angles relative to the outer surface 508 of the rotor assembly 230A** that are greater than about 90°).

FIG. 12B illustrates a rotor assembly 230B including helical features **1202*b*. The helical features 1202*b* may form spirals extending from a first end 1206 of the rotor assembly 230B to a second end 1208 of the rotor assembly 230B. In some embodiments, each helical feature 1202*b* may pass around the outer surface 508 of the rotor assembly 230 at least once between the first end 1206 and the second end 1208. In other embodiments, the helical features 1202*b* may not fully encircle the outer surface 508 between the first end 1206 and the second end 1208. The helical features 1202*b* may be raised features, such as ridges or recessed features, such as channels. In some embodiments, the helical features 1202*b* may be a combination of raised features and recessed features arranged in a pattern about the outer surface 508 of the rotor assembly 230B**. For example, each raised feature may be adjacent to a recessed feature.

In some embodiments, each of the helical features **1202*b* may be substantially evenly spaced along the outer surface 508 of the rotor assembly 230B. In other embodiments, the spacing between the helical features 1202*b* may vary, such that the spaces 1204 between some adjacent helical features 1202*b* are greater than the spaces 1204 between other adjacent helical features 1202*b*. In some embodiments, the spaces 1204 may be defined by other helical features 1202*b*. For example, the outer surface 508 may include helical ridges defining the helical features 1202***b* and the spaces 1204 between the helical ridges may form helical channels.

In some embodiments, the helical features 1202*b* may be substantially uniform. For example, the helical features 1202*b* may each have substantially the same heights, depths, and/or lengths. In other embodiments, the helical features 1202*b* may have different sizes. For example, some of the helical features 1202*b* may have heights or depths that are greater than others. In some embodiments, the helical features 1202*b* may have different shapes. For example, some of the helical feature 1202*b* may have rectangular shapes (e.g., defined primarily by 90° angles) and some of the helical feature 1202*b* may have triangular shapes (e.g., extending at angles relative to the outer surface 508 of the rotor assembly 230A that are greater than about 90°).

FIG. 12C illustrates a rotor assembly 230C including shaped features 1202*c* arranged about the outer surface 508 of the rotor assembly 230C. The shaped features 1202*c* may be raised features, such as bumps, or recessed features, such as divots or dimples. For example, as illustrated in FIG. 12C, the shaped feature 1202*c* may be a pattern of circular divots similar to the surface of a golf ball. In some embodiments, the shaped feature 1202*c* may be a combination of raised features and recessed features arranged in a pattern about the outer surface 508 of the rotor assembly 230C. The shaped features 1202*c* may be arranged in rows about the outer surface 508 of the rotor assembly 230C. In some embodiments, the rows may be offset, as illustrated in FIG. 12C to enable a larger number of shaped features 1202*c* to be arranged on the outer surface 508 of the rotor assembly 230C.

In some embodiments, the shaped features 1202*c* may have other shapes, such as ovals, ellipses, squares, rectangles, prisms, triangles, pyramids, cones, etc. In some embodiments, the shapes and sizes of the shaped features 1202*c* may be substantially uniform (e.g., substantially the same size and/or shape). In other embodiments, the sizes and/or shapes of the shaped features 1202*c* may vary. For example, some of the shaped features 1202*c* may be substantially circular and some of the shaped features 1202*c* may be rectangular. Some of the shaped features 1202*c* may be smaller than other shaped features 1202*c*. For example, the shaped features 1202*c* may have different depths, different heights, different major dimensions (e.g., radii, diameters, lengths, widths, apothems, etc.), etc.

In some embodiments, the rotor assembly 230 may include a combination of multiple different types of uneven features 512, such as linear features 1202*a*, helical features 1202*b*, and/or shaped features 1202*c* arranged on the outer surface 508 of the same rotor assembly 230. The different types of uneven features 512 may generate different types of turbulence in the fluids flowing over the outer surface 508 of the rotor assembly 230 the different types of turbulence may have different mixing properties. Thus, different uneven features 512 may enable the mixing device 100 to use the benefits of the different types of turbulence to mix the fluids in the mixing chamber 202 resulting in a homogeneous fluid mixture. As discussed above, greater amounts of turbulence may also enable the mixing device 100 to mix greater amounts of gas into the liquid.

Figure 13:
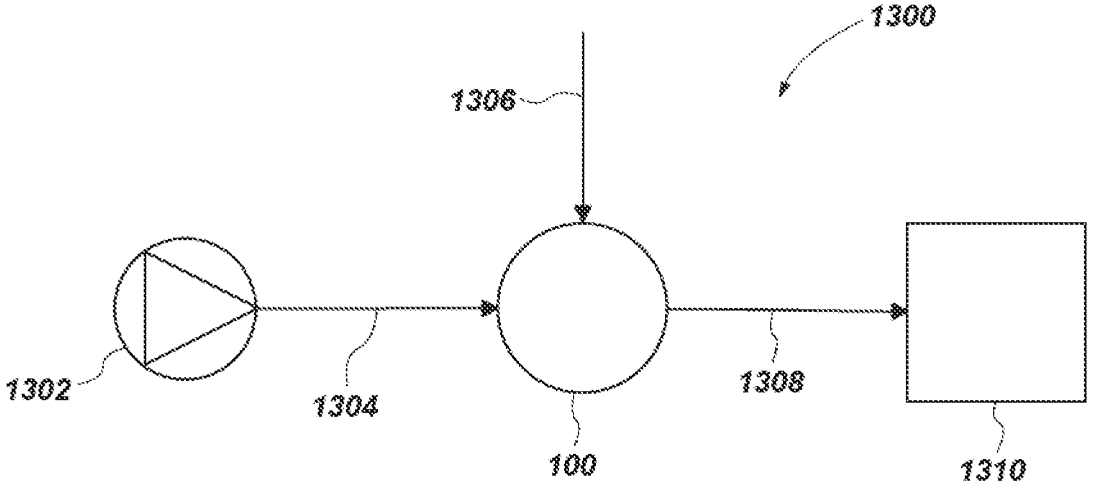
FIGS. 13 and 14 illustrate schematic views of mixing systems in accordance with one or more embodiments of the present disclosure.
Figure 14:
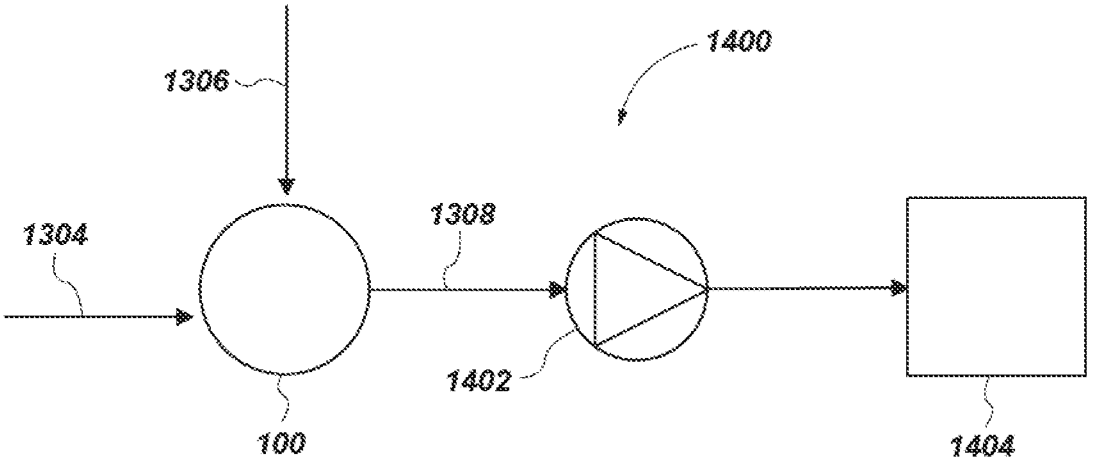

FIGS. 13 and 14 illustrate systems including a mixing device 100 described above. FIG. 13 illustrates a fluid mixing system 1300 including a pump 1302 configured to supply a first fluid 1304 to the mixing device 100. The pump 1302 may be a centrifugal pump, a reciprocal pump, a scroll pump, a turbine pump, etc., configured to induce flow into the first fluid 1304, such as by pressurizing the first fluid 1304. The first fluid 1304 may be a fluid in the liquid phase, such as water, de-ionized water, etc. The pressure from the pump 1302 may cause the first fluid 1304 to flow through the mixing device 100. The pump 1302 may be coupled to the mixing device 100 through a pipe (e.g., tubing, plumbing, lines, piping, etc.) configured to transfer the first fluid 1304 between the pump 1302 and the mixing device 100.

A second fluid 1306 may be supplied independently to the mixing device 100. The second fluid 1306 may be a fluid in the gas phase, such as oxygen, ozone, etc. In some embodiments, the second fluid 1306 may be pressurized to at least the same pressure as the first fluid 1304, such as by a compressor. The second fluid 1306 may be mixed into the first fluid 1304 in the manner described above with the mixing device 100.

After the second fluid 1306 is mixed into the first fluid 1304 a mixed fluid 1308 may flow out of the mixing device 100. The mixed fluid 1308 may include both the first fluid 1304 and the second fluid 1306 in a substantially homogeneous mixture. The mixed fluid 1308 may then flow from the mixing device 100 to another component 1310, such as a booster pump, a spray nozzle, a holding tank, etc. The flow of the mixed fluid 1308 from the mixing device 100 may be a result of the flow induced by the pump 1302 in the first fluid 1304.

FIG. 14 illustrates another embodiment of a fluid mixing system 1400. The fluid mixing system 1400 may include a mixing device 100. The mixing device 100 may be configured to receive a first fluid 1304 and a second fluid 1306. The first fluid 1304 may be a fluid in the liquid phase and the second fluid 1306 may be a fluid in the gas phase. The first fluid 1304 and the second fluid 1306 may be have a system pressure sufficient to flow the first fluid 1304 and the second fluid 1306 into the mixing device 100.

The second fluid 1306 may be mixed into the second fluid 1306 in the mixing device 100 in the manner described above. A mixed fluid 1308 may exit the mixing device 100. As described above, the mixed fluid 1308 may include both the first fluid 1304 and the second fluid 1306 in a substantially homogeneous mixture.

A pump 1402 may be configured to draw the mixed fluid 1308 from the mixing device 100. The pump 1402 may be a centrifugal pump, a reciprocal pump, a scroll pump, a turbine pump, etc., configured to induce flow into the mixed fluid 1308, such as by pressurizing the mixed fluid 1308. The pump 1402 may be coupled to the mixing device 100 through a pipe (e.g., tubing, plumbing, lines, piping, etc.) configured to transfer the mixed fluid 1308 between the mixing device 100 and the pump 1402. The pump 1402 may flow the mixed fluid 1308 into another component 1404 of the system, such as a spray nozzle, a holding tank, etc.

Liquids such as ozonated water may be used in cleaning processes, such as semiconductor cleaning processes. Higher concentrations of ozone in the ozonated water may increase the cleaning properties of the ozonated water. Thus, increasing the amount of gas mixed into a liquid may enable the creation of ozonated water and/or other mixtures having improved properties introduced by the gas. Embodiments of the present disclosure may enable large amounts of a gas to be mixed or dissipated into a liquid. Traditional methods of mixing gasses into liquids are passive and rely on the time it takes the gas to travel through the liquid to dissipate the gas into the liquid. Embodiments of the present disclosure actively mix the gas into the liquid by inducing turbulence into the liquid accelerating the mixing of the gas and the liquid resulting in substantially homogeneous mixtures having higher concentrations of the gas.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A mixing device, comprising:

a stator including:

at least two annular permanent magnets having a first polarity; and an inner surface;

a rotor configured to rotate relative to the stator, the rotor including:

at least two complementary annular permanent magnets having a second polarity, the at least two complementary annular permanent magnets positioned coaxially with the at least two annular permanent magnets; and a mixing cavity defined between the inner surface of the stator and an outer surface of the rotor, the mixing cavity extending from a first axial end of the rotor to a second axial end of the rotor, at least one of the inner surface of the stator and the outer surface of the rotor being an uneven surface comprising a pattern of recesses distributed throughout the mixing cavity;

wherein the mixing device does not include a pumping element within the mixing device.

2. The mixing device of claim 1, wherein the second polarity is opposite the first polarity.

3. The mixing device of claim 1, wherein the second polarity is a same polarity as the first polarity.

4. The mixing device of claim 1, wherein the rotor further comprises an armature, and the stator further comprises a drive magnet configured to induce rotation on the rotor through the armature.

5. The mixing device of claim 1, wherein the uneven surface comprises a plurality of raised features.

6. The mixing device of claim 1, wherein each of the outer surface of the rotor and the inner surface of the stator are uneven surfaces.

7. The mixing device of claim 1, further comprising:

a liquid inlet port;

a gas inlet port; and an outlet port configured to receive a fluid mixture of a liquid received through the liquid inlet port and a gas received through the gas inlet port, wherein the fluid mixture is formed in the mixing cavity.

8. The mixing device of claim 7, wherein the liquid inlet and the gas inlet are located on a first side of the mixing device, and the outlet is located on a second opposite side of the mixing device.

9. The mixing device of claim 1, wherein the stator comprises a pull magnet, and the rotor comprises a complementary pull magnet wherein the pull magnet comprises an electromagnet configured to adjust a position of the rotor by adjusting one or more of a pull strength and a polarity of the pull magnet.

10. The mixing device of claim 1, wherein the uneven surface comprises a pattern of recesses extending through a central portion of the mixing cavity.

* * * * *